(12) United States Patent
Irie et al.

(10) Patent No.: US 9,181,894 B2
(45) Date of Patent: *Nov. 10, 2015

(54) CONTROL SYSTEM FOR INTERNAL COMBUSTION ENGINE

(75) Inventors: Seiichiro Irie, Wako (JP); Hiroshi Kubo, Wako (JP); Yoshitomo Kono, Wako (JP); Hiroaki Tone, Wako (JP); Toshifumi Hiraboshi, Wako (JP); Junpei Yamamoto, Wako (JP); Hirotaka Komatsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 278 days.

This patent is subject to a terminal disclaimer.

(21) Appl. No.: 13/989,554

(22) PCT Filed: Oct. 26, 2011

(86) PCT No.: PCT/JP2011/074603
§ 371 (c)(1),
(2), (4) Date: May 24, 2013

(87) PCT Pub. No.: WO2012/093515
PCT Pub. Date: Jul. 12, 2012

(65) Prior Publication Data
US 2013/0245922 A1  Sep. 19, 2013

(30) Foreign Application Priority Data
Jan. 7, 2011  (JP) ................................ 2011-001591

(51) Int. Cl.
*F02D 41/26* (2006.01)
*F02D 43/04* (2006.01)
(Continued)

(52) U.S. Cl.
CPC ............ *F02D 43/04* (2013.01); *F02D 41/0062* (2013.01); *F02D 41/0072* (2013.01);
(Continued)

(58) Field of Classification Search
CPC ....... F02D 9/00; F02D 43/04; F02D 41/0072; F02D 41/18; F02D 41/003; F02D 41/30

USPC ............ 701/103–104, 108, 110; 123/568.21, 123/399, 436, 516, 520; 73/114.31, 114.32, 73/114.33, 114.39, 114.72, 114.74
See application file for complete search history.

(56) References Cited

U.S. PATENT DOCUMENTS 5,469,833 A  11/1995 Hara et al.
5,488,938 A  2/1996 Ohuchi
(Continued)

FOREIGN PATENT DOCUMENTS

JP  06-317198 A  11/1994
JP  08-028364 A  1/1996
(Continued)

OTHER PUBLICATIONS

International Search Report mailed Dec. 6, 2011 issued in corresponding International Application No. PCT/JP2011/074603.
(Continued)

*Primary Examiner* — Hai Huynh
(74) *Attorney, Agent, or Firm* — Squire Patton Boggs (US) LLP

(57) ABSTRACT

A control system for an internal combustion engine having a throttle valve disposed in an intake passage of the engine is provided. A wide-open intake air amount, which is an intake air amount corresponding to a state where the throttle valve is fully opened, is calculated according to the engine rotational speed, and a theoretical intake air amount, which is an intake air amount corresponding to a state where no exhaust gas of the engine is recirculated to a combustion chamber of the engine, is calculated according to the wide-open intake air amount and the intake pressure. An intake air amount of the engine is detected or estimated, and an amount of the evaporative fuel/air mixture supplied through the evaporative fuel passage to the intake passage is calculated. An intake gas amount is calculated by correcting the intake air amount using the evaporative fuel/air mixture amount, and an exhaust gas recirculation ratio is calculated using the theoretical intake air amount and the intake gas amount. The engine is controlled using the calculated exhaust gas recirculation ratio.

18 Claims, 16 Drawing Sheets

(51) Int. Cl.
   *F02P 5/15*    (2006.01)
   *F02D 41/00*   (2006.01)
   *F02D 41/18*   (2006.01)
   *F02M 25/07*   (2006.01)

(52) U.S. Cl.
   CPC ............. *F02P5/1502* (2013.01); *F02D 41/003* (2013.01); *F02D 41/18* (2013.01); *F02D 2041/001* (2013.01); *F02D 2200/0404* (2013.01); *F02D 2200/0406* (2013.01); *F02D 2200/101* (2013.01); *F02M 25/07* (2013.01); *F02P 5/1516* (2013.01); *Y02T 10/46* (2013.01); *Y02T 10/47* (2013.01)

(56) References Cited

U.S. PATENT DOCUMENTS

| | | |
|---|---|---|
| 2002/0026921 A1 | 3/2002 | Ueno et al. |
| 2002/0055814 A1 | 5/2002 | Kobayashi et al. |
| 2004/0154590 A1 | 8/2004 | Yasui et al. |
| 2005/0022792 A1 | 2/2005 | Harunari et al. |
| 2006/0011180 A1 | 1/2006 | Sasaki et al. |
| 2006/0157029 A1 | 7/2006 | Suzuki et al. |
| 2010/0242936 A1* | 9/2010 | Zurlo et al. .................. 123/704 |
| 2012/0053822 A1* | 3/2012 | Kosaka et al. ................ 701/108 |
| 2014/0338636 A1* | 11/2014 | Irie et al. ..................... 123/436 |

FOREIGN PATENT DOCUMENTS

| | | |
|---|---|---|
| JP | 2002-147279 A | 5/2002 |
| JP | 2003-239787 A | 8/2003 |
| JP | 2003-269306 A | 9/2003 |
| JP | 2004-116303 A | 4/2004 |
| JP | 2004-245085 A | 9/2004 |
| JP | 2005-048611 A | 2/2005 |
| JP | 2006-200396 A | 8/2006 |
| JP | 2006-200460 A | 8/2006 |
| JP | 2006-328963 A | 12/2006 |
| JP | 2007-297955 A | 11/2007 |
| JP | 2007-309298 A | 11/2007 |
| JP | 2007-321705 A | 12/2007 |
| JP | 2008-261256 A | 10/2008 |
| JP | 2009-030541 A | 2/2009 |

OTHER PUBLICATIONS

European Search Report application No. 11855059.9 dated Apr. 15, 2014.

* cited by examiner

FIG. 7
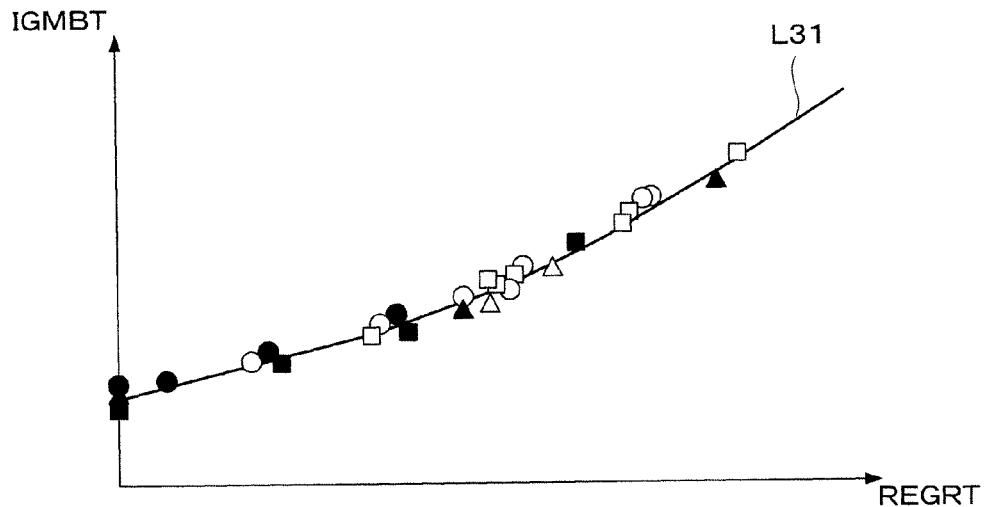
FIG. 8
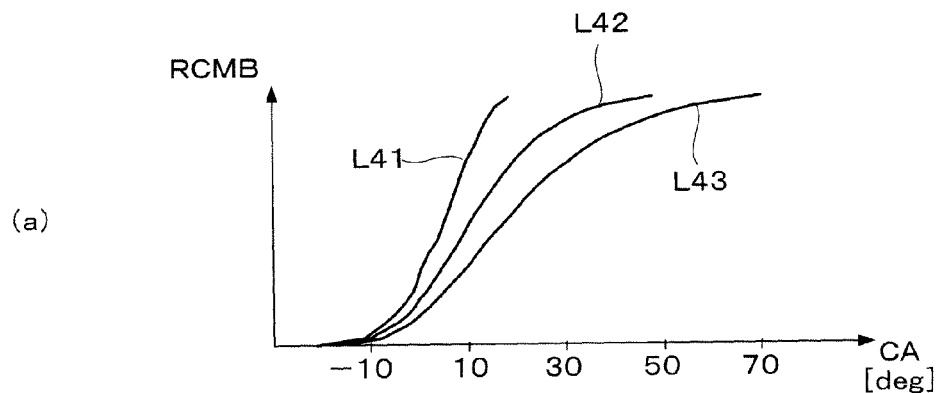
(a)
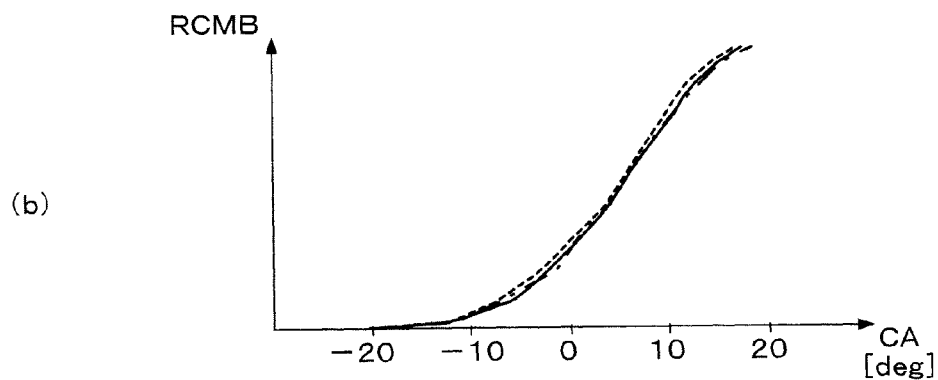
(b)

CONTROL SYSTEM FOR INTERNAL COMBUSTION ENGINE

TECHNICAL FIELD

The present invention relates to a control system for an internal combustion engine, and particularly to the control system for the internal combustion engine, which performs a control based on an exhaust gas recirculation ratio indicative of a ratio of exhaust gases (burnt gases) contained in the gases sucked into the combustion chamber of the engine.

BACKGROUND ART

Patent Document 1 (shown below) discloses a control system for an internal combustion engine, wherein a residual gas ratio (an internal exhaust gas recirculation ratio), which is a residual ratio of burnt gases remaining in the combustion chamber after combustion, is calculated, and the ignition timing is controlled according to the residual gas ratio. According to this control system, the residual gas ratio is calculated based on the engine rotational speed, the valve overlap amount (an overlapped period of the valve opening periods corresponding to the intake valve and the exhaust valve), the intake pressure, the exhaust gas temperature, and the intake air amount.

Further, a known control system for an internal combustion engine having an exhaust gas recirculation mechanism, uses a method for calculating an exhaust gas recirculation ratio using a map for calculating the exhaust gas recirculation ratio (the external exhaust gas recirculation ratio), the map being set according to an opening of the exhaust gas recirculation control valve.

PRIOR ART DOCUMENT

Patent Document

Patent Document 1: Japanese Patent Laid-open No. 2003-269306

SUMMARY OF THE INVENTION

Problems to be Solved by the Invention

According to the calculation method of the residual gas ratio shown in Patent Document 1, the number of parameters applied to the calculation is comparatively large, which raises a problem that the man power necessary for setting the tables or maps becomes large. Further, in the conventional method for calculating the external exhaust gas recirculation ratio, many maps are necessary corresponding to various operating conditions. Consequently, in order to calculate the exhaust gas recirculation ratio taking both of the internal exhaust gas recirculation and the external exhaust gas recirculation into account, still more tables or maps are necessary, which requires huge man power for setting tables and/or maps.

The present invention was made contemplating the above-described point, and an objective of the present invention is to provide a control system for an internal combustion engine, which can accurately calculate the exhaust gas recirculation ratio according to the engine operating condition with a comparatively simple method.

Means for Solving the Problems

To attain the above objective, the present invention provides a control system for an internal combustion engine having a throttle valve (3) disposed in an intake passage (2) of the engine, and an evaporative fuel passage for supplying an evaporative fuel/air mixture to the intake passage (2). The evaporative fuel/air mixture is a mixture of air and evaporative fuel generated in a fuel tank for supplying fuel to the engine. This control system is characterized by comprising rotational speed detecting means, intake pressure detecting means, wide-open intake air amount calculating means, theoretical intake air amount calculating means, intake air amount obtaining means, evaporative fuel/air mixture amount calculating means, intake gas amount calculating means, and exhaust gas recirculation ratio calculating means, wherein the engine is controlled using the exhaust gas recirculation ratio. The rotational speed detecting means detects an rotational speed (NE) of the engine, and the intake pressure detecting means detects an intake pressure (PBA) of the engine. The wide-open intake, air amount calculating means calculates a wide-open intake air amount (GAWOT) according to the engine rotational speed (NE). The wide-open intake air amount is an intake air amount corresponding to a state where the throttle valve (3) is fully opened. The theoretical intake air amount calculating means calculates a theoretical intake air amount (GATH) according to the wide-open intake air amount (GAWOT) and the intake pressure (PBA). The theoretical intake air amount (GATH) is an intake air amount corresponding to a state where no exhaust gas of the engine is recirculated to a combustion chamber of the engine. The intake air amount obtaining means detects or estimates an intake air amount (GAIRCYL) of the engine. The evaporative fuel/air mixture amount calculating means calculates an amount (GPGC) of the evaporative fuel/air mixture supplied through the evaporative fuel passage (25) to the intake passage (2). The intake gas amount calculating means calculates an intake gas amount (GINGASCYL) by correcting the intake air amount (GAIRCYL) using the evaporative fuel/air mixture amount (GPGC). The exhaust gas recirculation ratio calculating means calculates an exhaust gas recirculation ratio (REGRT) using the theoretical intake air amount (GATH) and the intake gas amount (GINGASCYL).

With this configuration, the wide-open intake air amount, which is an intake air amount corresponding to the state where the throttle valve is fully opened, is calculated according to the engine rotational speed, and the theoretical intake air amount, which is an intake air amount corresponding to the state where no exhaust gas of the engine is recirculated to the combustion chamber of the engine, is calculated according to the wide-open intake air amount and the intake pressure. Further, an amount of the evaporative fuel/air mixture supplied through the evaporative fuel passage to the intake passage is calculated, the intake gas amount is calculated by correcting the intake air amount using the evaporative fuel/air mixture amount, the exhaust gas recirculation ratio is calculated using the theoretical intake air amount and the intake gas amount, and the engine is controlled using the calculated exhaust gas recirculation ratio. Accordingly, it is not necessary for calculating the exhaust gas recirculation ratio to previously set many maps corresponding to various engine operating conditions, which can greatly reduce the man power for setting the maps. Further, even if the atmospheric pressure changes, the correcting calculation for the change in the atmospheric pressure is not necessary, which makes it possible to calculate the exhaust gas recirculation ratio simply and accurately. In addition, the exhaust gas recirculation ratio is calculated using the intake gas amount corrected using an amount of the evaporative fuel/air mixture supplied through the evaporative fuel passage to the intake passage.

Therefore, an accurate value of the exhaust gas recirculation ratio can be obtained even when the evaporative fuel is being supplied.

Preferably, the control system further comprises ignition timing control means which includes optimum ignition timing calculating means for calculating an optimum ignition timing (IGMBT) at which an output of the engine becomes maximum, according to the exhaust gas recirculation ratio (REGRT), and controls an ignition timing of the engine using the optimum ignition timing (IGMBT).

With this configuration, the optimum ignition timing is calculated according to the exhaust gas recirculation ratio, and the ignition timing is controlled using the calculated optimum ignition timing. It is confirmed that the relationship between the exhaust gas recirculation ratio and the optimum ignition timing is not affected by the operating phase of the intake valve or whether the external exhaust gas recirculation is performed or not. Accordingly, by setting the optimum ignition timing according to the exhaust gas recirculation ratio, the optimum ignition timing suitable for the engine operating condition can easily be calculated.

Preferably, the control system further includes evaporative fuel concentration calculating means, secondary fresh air amount calculating means, and corrected intake air amount calculating means. The evaporative fuel concentration calculating means calculates an evaporative fuel concentration (KAFEVACT) in the evaporative fuel/air mixture. The secondary fresh air amount calculating means calculates a fresh air amount in the evaporative fuel/air mixture as a secondary fresh air amount according to the evaporative fuel/air mixture amount (GPGC) and the evaporative fuel concentration (KAFEVACT). The corrected intake air amount calculating means calculates a corrected intake air amount (GAIRCYLC) by correcting the intake air amount (GAIRCYL) with the secondary fresh air amount (GPGACYL). In this control system, the ignition timing control means includes knock limit ignition timing calculating means for calculating a knock limit ignition timing (IGKNOCK) according to the exhaust gas recirculation ratio (REGRT) and the corrected intake air amount (GAIRCYLC), and performs the ignition timing control using any one of the optimum ignition timing (IGMBT) and the knock limit ignition timing (IGKNOCK) that is set to a more retarded value. The knock limit ignition timing corresponds to an occurrence limit of knocking in the engine.

With this configuration, the evaporative fuel concentration in the evaporative fuel/air mixture is calculated, and the fresh air amount in the evaporative fuel/air mixture is calculated as the secondary fresh air amount according to the evaporative fuel/air mixture amount and the evaporative fuel concentration. Further, the corrected intake air amount is calculated by correcting the intake air amount with the secondary fresh air amount, and the knock limit ignition timing is calculated according to the exhaust gas recirculation ratio and the corrected intake air amount. The knock limit ignition timing is highly correlated with the exhaust gas recirculation ratio. Accordingly, calculating the knock limit ignition timing according to the exhaust gas recirculation ratio, makes it possible to perform the ignition timing control with high accuracy. The engine output is therefore maximized within the range for surely avoiding the knocking. In addition, the amount of fresh air sucked into the cylinder is equal to a sum of the intake air amount and the fresh air amount in the evaporative fuel/air mixture. Accordingly, calculating the knock limit ignition timing according to the corrected intake air amount in addition to the exhaust gas recirculation ratio, makes it possible to improve calculation accuracy of the knock limit ignition timing.

Preferably, the engine is provided with an intake valve operating characteristic varying mechanism (42) which changes an operating phase (CAIN) of the intake valve, and the ignition timing control means includes correcting means for correcting the knock limit ignition timing (IGKNOCK) according to the operating phase (CAIN) of the intake valve.

With this configuration, the knock limit ignition timing is corrected according to the operating phase of the intake valve. Accordingly, an accurate value of the knock limit ignition timing can be obtained for the engine in which the operating phase of the intake valve is changed according to the engine operation condition.

Preferably, the correcting means calculates an effective compression ratio (CMPR) of the engine according to the operating phase (CAIN) of the intake valve, and corrects the knock limit ignition timing (IGKNOCK) according to the effective compression ratio (CMPR).

With this configuration, the effective compression ratio of the engine is calculated according to the operating phase of the intake valve, and the knock limit ignition timing is corrected according to the effective compression ratio. The knock limit ignition timing changes depending on the effective compression ratio. Accordingly, the knock limit ignition timing can appropriately be corrected by calculating the effective compression ratio of the engine according to the operating phase of the intake valve, and correcting the knock limit ignition timing according to the effective compression ratio.

Preferably, the control system further comprises throttle valve opening detecting means for detecting an opening (TH) of the throttle valve, and effective opening calculating means for calculating an effective opening (THEFCT) of the throttle valve according to the engine rotational speed. The effective opening (THEFCT) is a throttle valve opening at which an increasing rate of the intake pressure (PBA) with respect to an increase in the throttle valve opening becomes equal to or lower than a predetermined increasing rate. Further, the exhaust gas recirculation ratio calculating means sets the exhaust gas recirculation ratio (REGRT) to "0" when the throttle valve opening (TH) is equal to or greater than the effective opening (THEFCT).

With this configuration, the effective opening of the throttle valve is calculated according to the engine rotational speed, and the exhaust gas recirculation ratio is set to "0" when the throttle valve opening is equal to or greater than the effective opening. When performing a rapid acceleration in which the throttle valve opening rapidly increases from a low engine speed condition, the increase in the amount of air actually supplied to the cylinder delays from the increase in the intake pressure. The calculation error therefore becomes large if calculating the exhaust gas recirculation ratio using the intake air amount and the theoretical intake air amount (which is calculated according to the intake pressure). When the throttle valve opening is equal to or greater than the effective opening, the actual exhaust gas recirculation ratio substantially becomes "0". Accordingly, the actual exhaust gas recirculation ratio can be approximated more accurately by setting the exhaust gas recirculation ratio to "0". Consequently, performing the engine control (ignition timing control and fuel supply amount control) using thus calculated exhaust gas recirculation ratio makes it possible to avoid unsuitable control during the transient operating condition of rapid acceleration, thereby preventing occurrence of knocking or deterioration of the exhaust gas characteristic.

BRIEF DESCRIPTION OF THE DRAWINGS

FIG. 7 show a relationship between the total exhaust gas recirculation ratio (REGRT) and the optimum ignition timing (IGMBT).

FIG. 8 shows changes in the mass combustion rate (RCMB).

MODE FOR CARRYING OUT THE INVENTION

Preferred embodiments of the present invention will now be described with reference to the drawings.

First Embodiment

Figure 1:
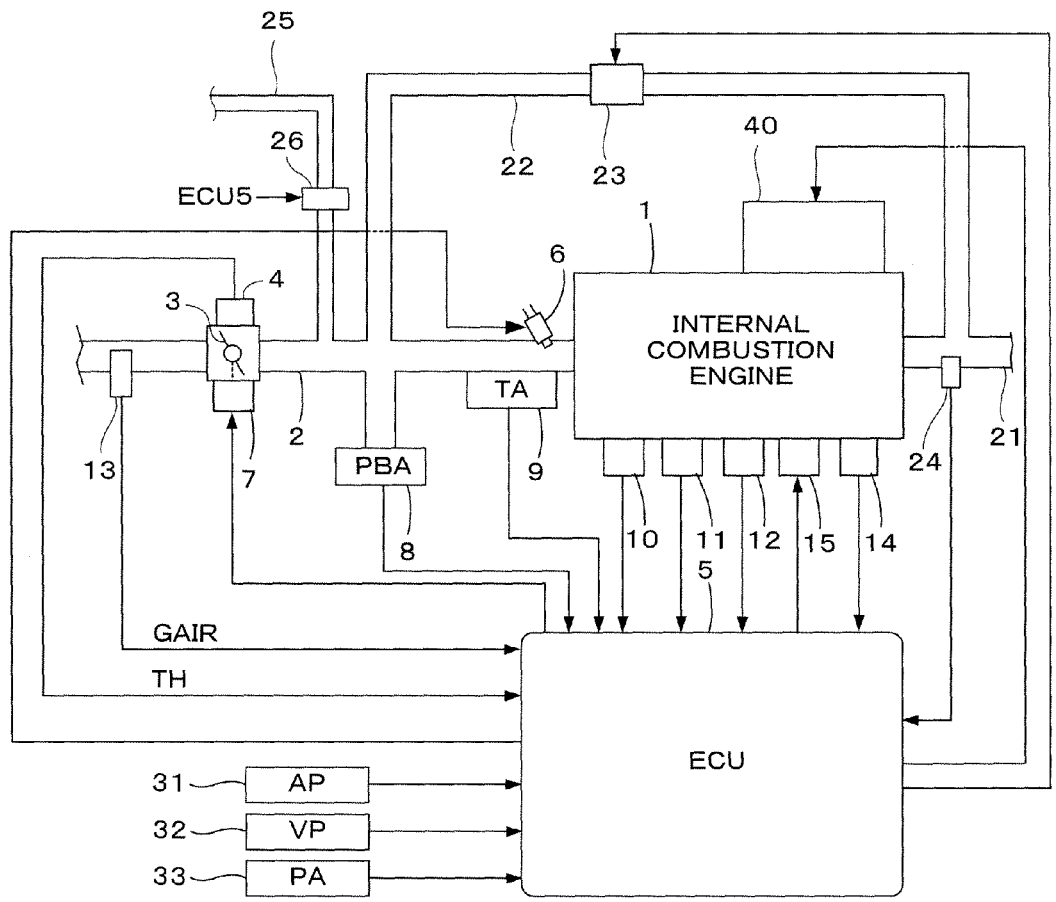
FIG. 1 shows a configuration of an internal combustion engine according to one embodiment of the present invention and a control system therefor.

FIG. 1 is a schematic diagram showing a configuration of an internal combustion engine and a control system therefor according to one embodiment of the present invention.

Figure 2:
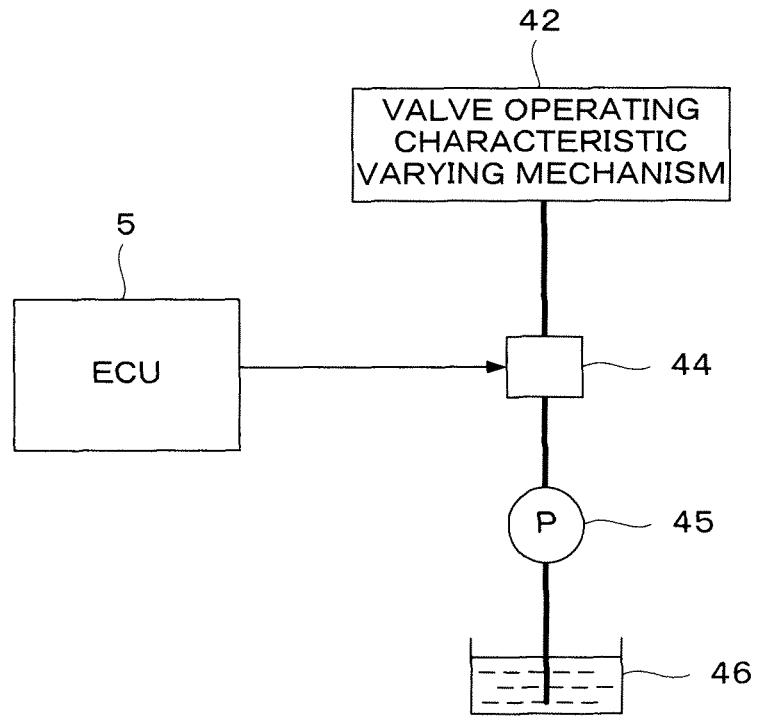
FIG. 2 is a diagram showing a configuration of a valve operating characteristic varying device shown in FIG. 1.

FIG. 2 is a schematic diagram showing a configuration of a valve operating characteristic varying device. Referring to FIG. 1, an internal combustion engine (hereinafter referred to as "engine") 1 having, for example, four cylinders is provided with intake valves, exhaust valves, and cams for driving the intake valves and the exhaust valves. The engine 1 is provided with a valve operating characteristic varying device 40 having a valve operating characteristic varying mechanism 42 as a cam phase varying mechanism for continuously varying the operating phase of the cams for driving, the intake valves with reference to a rotational angle of the crank shaft of the engine 1. The valve operating characteristic varying mechanism 42 varies the operating phase of the cam for driving each intake valve, and consequently varies the operating phase of each intake valve.

The engine 1 has an intake passage 2 provided with a throttle valve 3. A throttle valve opening sensor 4 for detecting an opening of the throttle valve 3 is connected to the throttle valve 3. The detection signal of the throttle valve opening sensor 4 is supplied to an electronic control unit (referred to as "ECU") 5. An actuator 7 for actuating the throttle valve 3 is connected to the throttle valve 3, and the operation of the actuator 7 is controlled by the ECU 5.

The intake passage 2 is provided with an intake air flow rate sensor 13 for detecting an intake air flow rate GAIR of the engine 1. The detection signal of the intake air flow rate sensor 13 is supplied to the ECU 5.

An evaporative fuel passage 25 is connected to the intake passage 2 downstream of the throttle valve 3, and the evaporative fuel passage 25 is connected to a canister (not shown). The evaporative fuel passage 25 is provided with a purge control valve 26 for controlling a flow rate of an evaporative fuel and air mixture (an evaporative fuel/air mixture, which is hereinafter referred to as "purge gas"). Operation of the purge control valve 26 is controlled by the ECU 5. The canister stores evaporative fuel generated in the fuel tank which supplies fuel to the engine 1. When opening the purge control valve 26, the purge gas is supplied from the canister through the evaporative fuel passage 25 to the intake passage 2.

An exhaust gas recirculation passage 22 is disposed between an exhaust passage 21 and the intake passage 2, and connected to the intake passage 2 downstream of the throttle valve 3. The exhaust gas recirculation passage 22 is provided with an exhaust gas recirculation control valve 23 for controlling a recirculation amount of exhaust gases. Operation of the exhaust gas recirculation control valve 23 is controlled by the ECU 5.

The exhaust passage 21 is provided with an oxygen concentration sensor 24 (hereinafter referred to as "LAF sensor 24"). The LAF sensor 24 supplies a detection signal which is substantially proportional to an oxygen concentration in the exhaust gases a r/fuel ratio).

Fuel injection valves 6 are inserted into the intake pipe 2 at locations intermediate between the cylinder block of the engine 1 and the throttle valves 3 and slightly upstream of the respective intake valves (not shown). These fuel injection valves 6 are connected to a fuel pump (not shown), and electrically connected to the ECU 5. A valve opening period of each fuel injection valve 6 is controlled by a signal output from the ECU 5.

A spark plug 15 of each cylinder of the engine 1 is connected to the ECU 5. The ECU 5 supplies an ignition signal to each spark plug 15 and controls the ignition timing.

An intake pressure sensor 8 for detecting an intake pressure PBA and an intake air temperature sensor 9 for detecting an intake air temperature TA are disposed downstream of the throttle valve 3. Further, an engine coolant temperature sensor 10 for detecting an engine coolant temperature TW is mounted on the body of the engine 1. The detection signals from these sensors are supplied to the ECU 5.

A crank angle position sensor 11 and a cam angle position sensor 12 are connected to the ECU 5. The crank angle position sensor 11 is provided to detect a rotational angle of a crankshaft (not shown) of the engine 1, and the cam angle position sensor 12 is provided to detect a rotational angle of the camshaft to which the cams for driving the intake valves of the engine 1 are fixed. A signal corresponding to the rotational angle detected by the crank angle position sensor 11 and a signal corresponding to the rotational angle detected by the cam angle position sensor 12 are supplied to the ECU 5. The crank angle position sensor 11 generates one pulse (hereinafter referred to as "CRK pulse") at every constant crank angle period (e.g., a period of 6 degrees) and a pulse for specifying a predetermined angle position of the crankshaft. The cam angle position sensor 12 generates a pulse at a predetermined crank angle position for a specific cylinder of the engine 1 (this pulse will be hereinafter referred to as "CYL pulse"). The cam angle position sensor 12 further generates a pulse at a top dead center (TDC) starting the intake stroke in each cylinder (this pulse will be hereinafter referred to as "TDC pulse"). These pulses are used to control various timings such as the fuel injection timing and the ignition timing, as well as to detect an engine rotational speed NE. An actual operating phase CAIN of the camshaft is detected based on the correlation between the TDC pulse output from the cam angle position sensor 12 and the CRK pulse output from the crank angle position sensor 11.

A knock sensor 14 for detecting a high frequency vibration is mounted on a proper position of the engine 1. The detection signal of the knock sensor 14 is supplied to the ECU 5. Further, an accelerator sensor 31, a vehicle speed sensor 32, and an atmospheric pressure sensor 33 are also connected to the ECU 5. The accelerator sensor 31 detects a depression amount AP of an accelerator pedal of the vehicle driven by the engine 1 (the depression amount will be hereinafter referred to as "accelerator operation amount"). The vehicle speed sensor 32 detects a running speed (vehicle speed) VP of the vehicle. The atmospheric pressure sensor 33 detects an atmospheric pressure PA. The detection signals from these sensors are supplied to the ECU 5.

The valve operating characteristic varying device 40, as shown in FIG. 2, includes a valve operating characteristic varying mechanism 42 and a solenoid valve 44. The valve operating characteristic varying mechanism 42 continuously varies an operating phase of each intake valve. An opening of the solenoid valve 44 is continuously varied to change the operating phase of each intake valve. The operating phase CAIN of the camshaft is used as a parameter indicative of the operating phase of the intake valve (hereinafter referred to as "intake valve operating phase CAIN"). A lubricating oil in an oil pan 46 is pressurized by an oil pump 45, and supplied to the solenoid valve 44. It is to be noted that a specific configuration of the valve operating characteristic varying mechanism 42 is described, for example, in Japanese Patent Laid-open No. 2000-227013.

Figure 3:
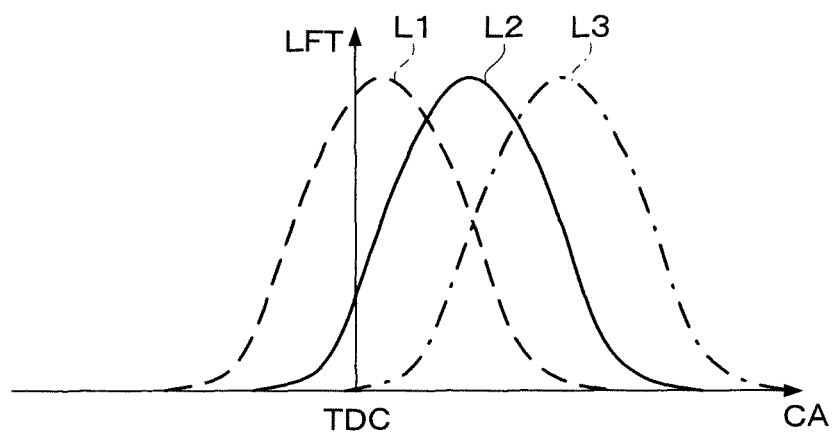
FIG. 3 shows changes in the operating phase of the intake valve.

According to the valve operating characteristic varying mechanism 42, the intake valve is driven with a phase from the most advanced phase shown by the broken line L1 in FIG. 3 to the most retarded phase shown by the dot-and-dash line L3, depending on a change in the operating phase CAIN of the camshaft. In FIG. 3, the characteristic shown by the solid line L2 is the center of the variable phase range. In this embodiment, the intake valve operating phase CAIN is defined as an advancing angular amount from the most retarded phase.

The ECU 5 includes an input circuit having various functions including a function of shaping the waveforms of input signals from the various sensors, a function of correcting the voltage levels of the input signals to a predetermined level, and a function of converting analog signal values into digital signal values. The ECU 5 further includes a central processing unit (hereinafter referred to as "CPU"), a memory circuit, and an output circuit. The memory circuit preliminarily stores various operating programs to be executed by the CPU and the results of computation or the like by the CPU. The output circuit supplies drive signals to the actuator 7, the fuel injection valves 6, the ignition plugs 15, the exhaust gas recirculation control valve 23, and the solenoid valve 44.

The CPU in the ECU 5 performs the ignition timing control, the opening control of the throttle valve 3, the control of an amount of fuel to be supplied to the engine 1 (the opening period of each fuel injection valve 6), the exhaust gas recirculation amount control with the exhaust gas recirculation control valve 23, and the valve operating characteristic control with the solenoid valve 44, according to the detection signals from the above-described sensors.

The opening period TOUT of the fuel injection valve 6 is calculated by the following equation (1).

$$TOUT = TIM \times KCMD \times KAF \times KTOTAL \quad (1)$$

In the equation (1), TIM is a basic fuel amount, which is specifically a basic fuel injection period of the fuel injection valve 6, and determined by retrieving a TIM table which is set according to the intake air flow rate GAIR. The TIM table is set so that the air-fuel ratio of air-fuel mixture supplied to the engine is substantially equal to the stoichiometric air-fuel ratio.

KCMD is a target air-fuel ratio coefficient which is set according to the operating condition of the engine 1. The target air-fuel ratio coefficient KCMD is proportional to a reciprocal of the air-fuel ratio A/F, i.e., proportional to a fuel-air ratio F/A, and takes a value of "1.0" when the air-fuel ratio is equal to the stoichiometric air-fuel ratio. The target air-fuel ratio coefficient KCMD is therefore referred to also as "target equivalent ratio".

KAF is an air-fuel ratio correction coefficient calculated using a PID (proportional, integral, and differential) control method or an adaptive control method using a self-tuning regulator so that a detected equivalent ratio KACT calculated from a detected value of the LAF sensor 24 coincides with the target equivalent ratio KCMD when an execution condition of the air-fuel ratio feedback control is satisfied.

KTOTAL is a product of other correction coefficients (a correction coefficient KTW set according the engine coolant temperature TW, a correction coefficient KTA set according to the intake air temperature TA, and the like) computed according to various engine parameter signals.

Next, an outline of a method for calculating an exhaust gas recirculation ratio in this embodiment is described below. In the following description, the dimension of gas amounts, such as "intake air amount", "recirculated exhaust gas amount", and the like is specifically a mass of gases per 1 TDC period (=a generation period of the TDC pulse, for example, a period of 180-degree rotation of the crankshaft, as to the 4-cylinder engine).

Figure 4:
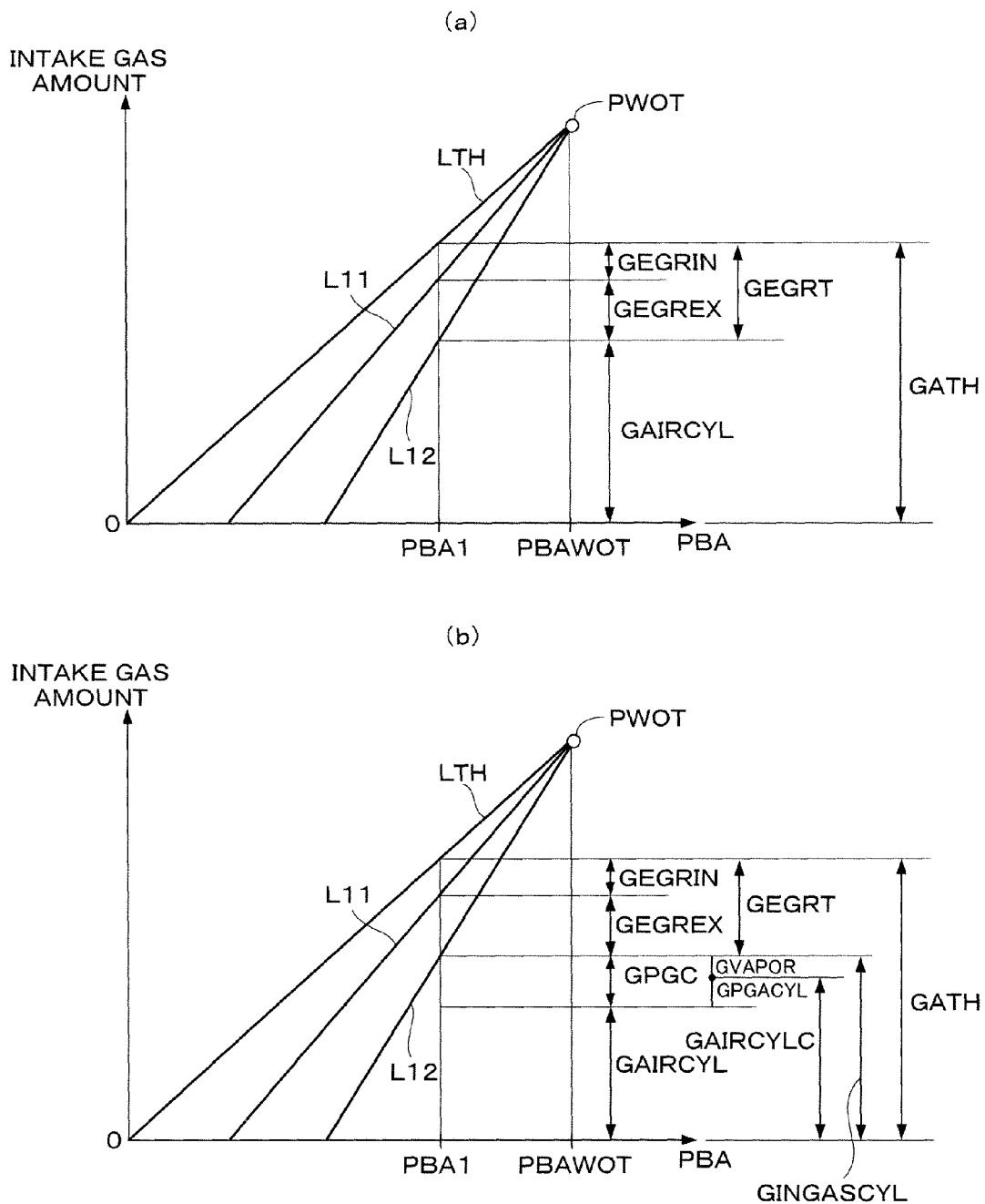
FIG. 4 is a graph for illustrating a calculation method of the total exhaust gas recirculation ratio (REGRT).

FIG. 4 is a graph for illustrating a calculation method of a total exhaust gas recirculation ratio (hereinafter referred to as "total EGR ratio") REGRT in this embodiment. FIG. 4 shows a relationship between the intake pressure PBA and an amount of gases supplied to the engine (an amount of air+an amount of recirculated exhaust gases). The relationship of FIG. 4 is obtained under the condition that the engine rotational speed NE and the intake valve operating phase CAIN are constant. The total EGR ratio REGRT is a ratio of the total exhaust gas recirculation amount with respect to the total intake gas amount (theoretical intake air amount GATH) (refer to the equations (12) and (15) described later). The total exhaust gas recirculation amount is a sum of the internal exhaust gas recirculation amount and the external exhaust gas recirculation amount through the exhaust gas recirculation passage 22. FIG. 4(a) corresponds to the state in which the purge control valve 26 is closed and the purge gas is not supplied to the intake passage 2 (hereinafter referred to as "purge stop state"), and FIG. 4(b) corresponds to the state in which the purge control valve 26 is opened and the purge gas is supplied to the intake passage 2 (hereinafter referred to as "purge execution state").

In FIG. 4, the operating point PWOT corresponds to the state where the throttle valve 3 is fully opened, and indicates the theoretical operating point at which no external exhaust gas recirculation is performed, and no internal exhaust gas recirculation is performed. At the operating point PWOT, the intake air amount takes the maximum value under the condition that the engine rotational speed NE is constant. It is to be noted that the residual gas ratio (the internal exhaust gas recirculation ratio) does not actually become "0" in the state where the throttle valve 3 is fully opened. However, the internal exhaust gas recirculation ratio takes the minimum value, since the intake pressure PBAWOT becomes almost equal to the atmospheric pressure PA. The straight line LTH passing the operating point PWOT and the starting point, indicates a theoretical relationship between the intake air amount and the intake pressure, wherein no external exhaust gas recirculation and no internal exhaust gas recirculation is performed. This straight line LTH is hereinafter referred to as "theoretical intake air amount straight line LTH". The line L11 indicates a relationship corresponding to the state where only the internal exhaust gas recirculation is performed, and the line L12 indicates a relationship corresponding to the state where both of the internal exhaust gas recirculation and the external exhaust gas recirculation are performed. It is to be noted that the lines L11 and L12 are indicated as straight lines for explanation, although they are not actually straight lines.

Firstly, the calculation method of the total EGR ratio REGRT in the purge stop state is described below referring FIG. 4(a).

If the gas amount on the theoretical intake air amount straight line LTH corresponding to the state where the intake pressure is equal to PBA1 is defined as a "theoretical intake air amount GATH", the theoretical intake air amount GATH is expressed with the following equation (11). In the equation (11), GAIRCYL indicates an intake air amount (fresh air amount), and GEGRIN, GEGREX, and GEGRT respectively indicate an internal exhaust gas recirculation amount, an external exhaust gas recirculation amount, and a total exhaust gas recirculation amount.

$$GATH = GAIRCYL + GEGRIN + GEGREX \quad (11)$$
$$= GAIRCYL + GEGRT$$

Accordingly, the total EGR ratio REGRT is calculated by the following equation (12).

$$REGRT = GEGRT/GATH \quad (12)$$
$$= (GATH - GAIRCYL)/GATH$$

On the other hand, in the purge execution state, the theoretical intake air amount GATH is given by the following equation (13). In the equation (13), GPGC is an amount of the purge gas supplied through the evaporative fuel passage 26 to the intake passage 2. The purge gas amount GPGC is expressed, with the following equation (14), as a sum of an amount GVAPOR of the evaporative fuel contained in the purge gas and an amount GPGACYL of fresh air contained in the purge gas. GPGACYL is hereinafter referred to as "secondary fresh air amount". Further, GINGASCYL in the equation (13) is a sum of the intake air amount GAIRCYL and the purge gas amount GPGC. GINGASCYL is hereinafter referred to as "intake gas amount".

$$GATH = GAIRCYL + GPGC + GEGRIN + GEGREX \quad (13)$$
$$= GINGASCYL + GEGRT$$

$$GPGC = GVAPOR + GPGACYL \quad (14)$$

Accordingly, the total EGR ratio REGRT is calculated by the following equation (15).

$$REGRT = GEGRT/GATH \quad (15)$$
$$= (GATH - GINGASCYL)/GATH$$

It is to be noted that a corrected intake air amount GAIRCYLC (refer to FIG. 4(b)), which is calculated by adding the secondary fresh air amount GPGACYL and the intake air amount GAIRCYL, is used in the control of the ignition timing IGLOG as described later.

By setting the purge gas amount GPGC to "0" in the equations (13) and (15) corresponding to the purge execution state, the equations (11) and (12) corresponding to the purge stop state are obtained. Therefore, the equations (13) and (15) corresponding to the purge execution state are used as basic equations in the following description.

Figure 5:
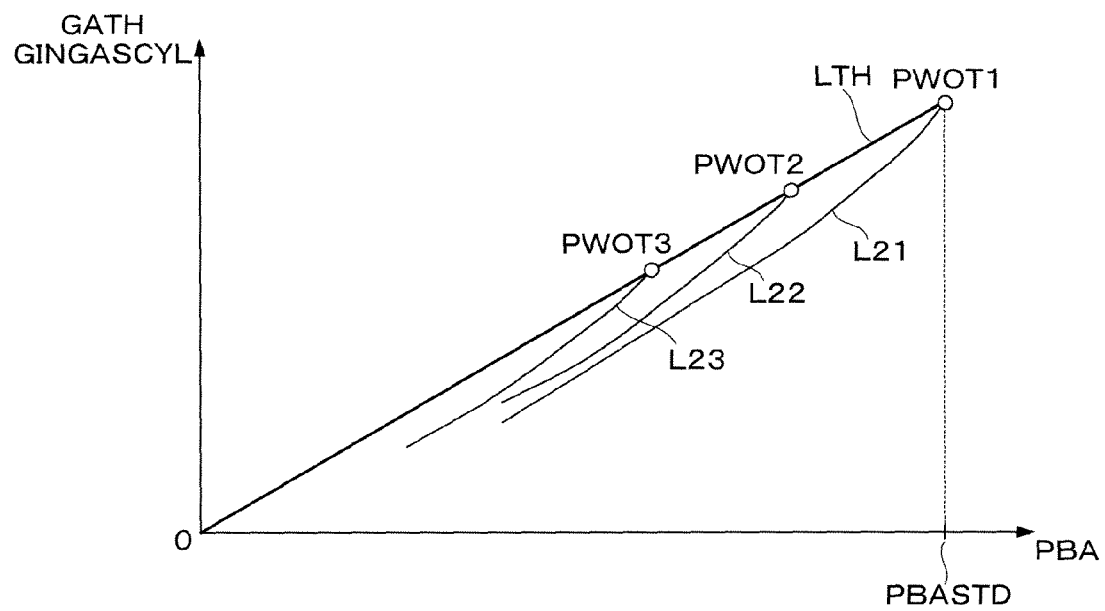
FIG. 5 is a graph for illustrating changes in the theoretical wide-open air amount (GAWOT) corresponding to changes in the atmospheric pressure.

FIG. 5 is a graph for illustrating a case where the atmospheric pressure changes. In FIG. 5, the wide-open operating point PWOT1 is an operating point corresponding to a reference state in which the intake pressure PBA is equal to a reference intake pressure PBASTD (for example, 100 kPa (750 mmHg)). When the vehicle moves to a higher altitude place and the atmospheric pressure falls, the operating point PWOT1 moves to the operating point PWOT2 and next to the operating point PWOT3 on the theoretical intake air amount straight line LTH. The curves L21-L23 starting from the operating points PWOT1-PWOT3 respectively indicate the intake gas amount GINGASCYL which is obtained by taking the internal exhaust gas recirculation into account (i.e., when no external exhaust gas recirculation is performed).

As described above, in this embodiment, it is not necessary to change the theoretical intake air amount straight line LTH depending on changes in the atmospheric pressure, and the total EGR ratio REGRT can accurately be calculated also at high altitude places.

However, it is necessary to perform an air density correction depending on changes in the intake air temperature TA, and the air density correction is performed according to the detected intake air temperature TA using the following equation (16). In the equation (16), TASTD is an intake air temperature in a reference condition (for example, 25 degrees C.), and GAWOTSTD is an intake air amount corresponding to the wide-open operating point PWOT in the reference condition. GAWOTSTD is hereinafter referred to as "reference theoretical wide-open air amount GAWOTSTD". Further, GAWOT is an intake air amount corresponding to the wide-open operating point PWOT in the operating condition of the detected intake air temperature TA. GAWOT is hereinafter referred to as "theoretical wide-open air amount GAWOT".

"n" in the equation (16) is a constant which is empirically set to a value from "0" to "1", for example, set to "0.5".

[Eq. 1]

$$GAWOT = GAWOTSTD \times \left(\frac{TASTD + 273}{TA + 273}\right)^n \quad (16)$$

Figure 6:
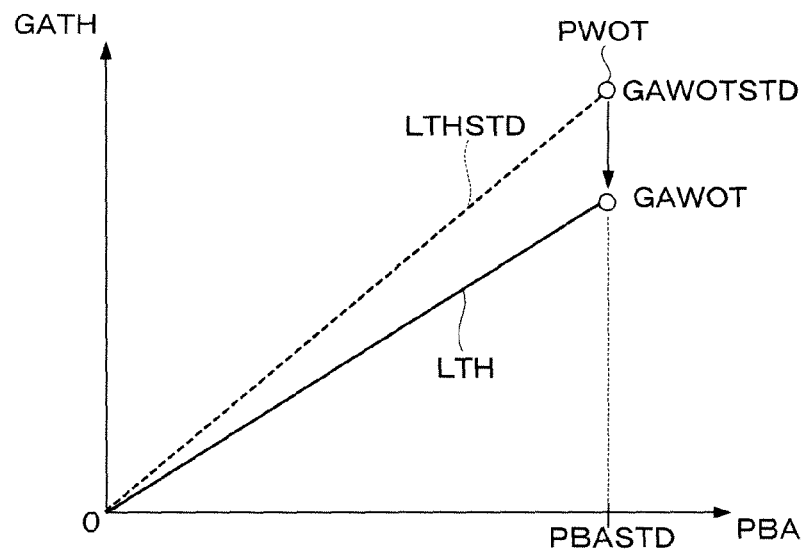
FIG. 6 is a graph for illustrating a correction according to the intake air temperature.

The straight line LTHSTD shown in FIG. 6 is a theoretical intake air amount straight line in the reference condition, and the straight line LTH is a theoretical intake air amount straight line corresponding to the detected intake air temperature TA. It is to be noted that FIG. 6 corresponds to an example in which the detected intake air temperature TA is higher than the reference intake air temperature TASTD.

FIG. 7 is a graph for illustrating a relationship between the total EGR ratio REGRT and an optimum ignition timing IGMBT (the engine rotational speed NE is fixed). The optimum ignition timing IGMBT is an ignition timing at which the engine output torque becomes the maximum. In FIG. 7, the black circles (●) and the white circles (○) correspond to an operating condition where the intake valve operating phase CAIN is "0" degree, the black squares (■) and the white squares (□) correspond to an operating condition where the intake valve operating phase CAIN is "20" degrees, and the black triangles (▲) and the white triangles (A) correspond to an operating condition where the intake valve operating phase CAIN is "45" degrees. Further, the black symbols (●, ■, and ▲) correspond to the case where no external exhaust gas recirculation is performed (only the internal exhaust gas recirculation is performed), and the white symbols (○, □, and Δ) correspond to the case where the external exhaust gas recirculation is performed (both of the internal exhaust gas recirculation and the external exhaust gas recirculation are performed).

According to FIG. 7, it is confirmed that the relationship between the total EGR ratio REGRT and the optimum ignition timing IGMBT depends neither on the operating phase CAIN of the intake valve nor on whether the external exhaust gas recirculation is performed or not, i.e., the curve L31 can represent the relationship between REGRT and IGMBT. Accordingly, only one optimum ignition timing calculation map (IGMBT map) set according to the engine rotational speed NE and the total EGR ratio REGRT, makes it possible to set the optimum ignition timing corresponding to all engine operating conditions. Consequently, the manpower for setting maps can greatly be reduced.

FIG. 8 shows changes in the mass combustion rate RCMB of the air-fuel mixture sucked in the combustion chamber (the horizontal axis indicates the crank angle CA). FIG. 8(a) shows changes in the mass combustion rate RCMB in a condition where the charging efficiency ηc is constant and the total EGR ratio REGRT is changed. Specifically, the curves L41-L43 correspond respectively to operating conditions in which the total EGR ratio REGRT is set to "6.3%", "16.2%, and "26.3%". The curve L41 indicates the fastest burning speed. That is, it is confirmed that the total EGR ratio REGRT is a main factor which changes the burning speed of the air-fuel mixture.

On the other hand, FIG. 8(b) shows changes in the mass combustion rate RCMB in a condition where the total EGR ratio REGRT is constant and the charging efficiency ηc is changed (the solid line, the dashed line, and the dot-and-dash line). The three lines indicated in FIG. 8(b) almost overlap with each other, which shows that the burning speed of the air-fuel mixture hardly changes even if the charging efficiency ηc is changed. It is therefore preferable that the optimum ignition timing IGMBT is set not according to the charging efficiency ηc (the fresh intake air amount) but according to the total EGR ratio REGRT.

Figure 9:
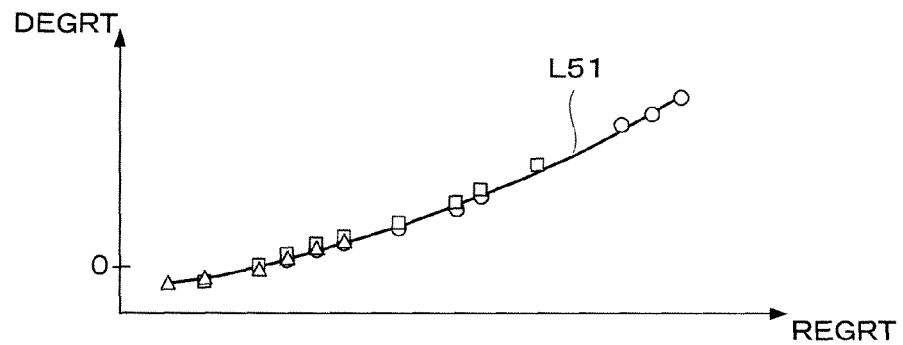
FIG. 9 shows a relationship between the total exhaust gas recirculation ratio (REGRT) and an EGR knocking correction amount (DEGRT).

FIG. 9 shows a relationship between the total EGR ratio REGRT and an EGR knock correction amount DEGRT of the ignition timing (the engine rotational speed NE is fixed). The EGR knock correction amount DEGRT is an ignition timing correction amount (a correction amount in the advancing direction) applied to a calculation of a knock limit ignition timing IGKNOCK, in order to perform the correction corresponding to changes in the exhaust gas recirculation amount. The knock limit ignition timing IGKNOCK corresponds to an occurrence limit of knocking in the engine, i.e., the most advanced ignition timing at which no knocking occurs. The symbols ○, □, and Δ in FIG. 9 indicate data corresponding to three different charging efficiencies ηc, and it is confirmed that the relationship does not depend on the charging efficiency ηc. Accordingly, the curve L51 can represent the relationship between the total EGR ratio REGRT and the EGR knock correction amount DEGRT under the condition that the engine rotational speed NE is fixed. Consequently, the EGR knock correction amount DEGRT can appropriately be set by using the DEGRT map which is set according to the engine rotational speed NE and the total EGR ratio REGRT. It is to be noted that a modification according to the intake valve operating phase CAIN may be necessary due to differences in the engine characteristics, although the relationship indicated with the curve L51 is basically independent of the intake valve operating phase CAIN. In such case, two or more tables corresponding to different intake valve operating phases CAIN may be used, or the correction according to the intake valve operating phase CAIN may be performed.

Figure 10:
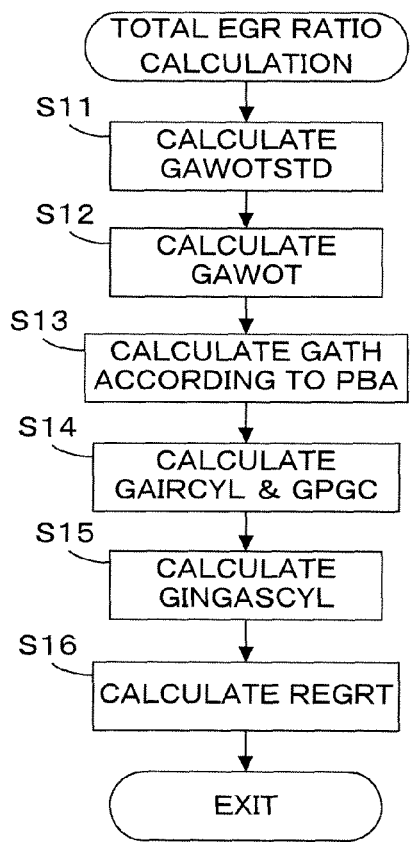
FIG. 10 is a flowchart of a process for calculating the total exhaust gas recirculation ratio (first embodiment).

FIG. 10 is a flowchart of a process for calculating the total EGR ratio REGRT. This process is executed by the CPU in the ECU 5 in synchronism with generation of the TDC pulse.

In step S11, a GAWOTSTD map which is set according to the engine rotational speed NE and the intake valve operating phase CAIN, is retrieved to calculate the reference theoretical wide-open air amount GAWOTSTD. In step S12, the correction according to the intake air temperature TA with the above-described equation (16) is performed to calculate the theoretical wide-open air amount GAWOT.

In step S13, the detected intake pressure PBA is applied to the following equation (17) to calculate the theoretical intake air amount GATH.

$$GATH = GAWOT \times PBA/PBASTD \quad (17)$$

Figure 12:
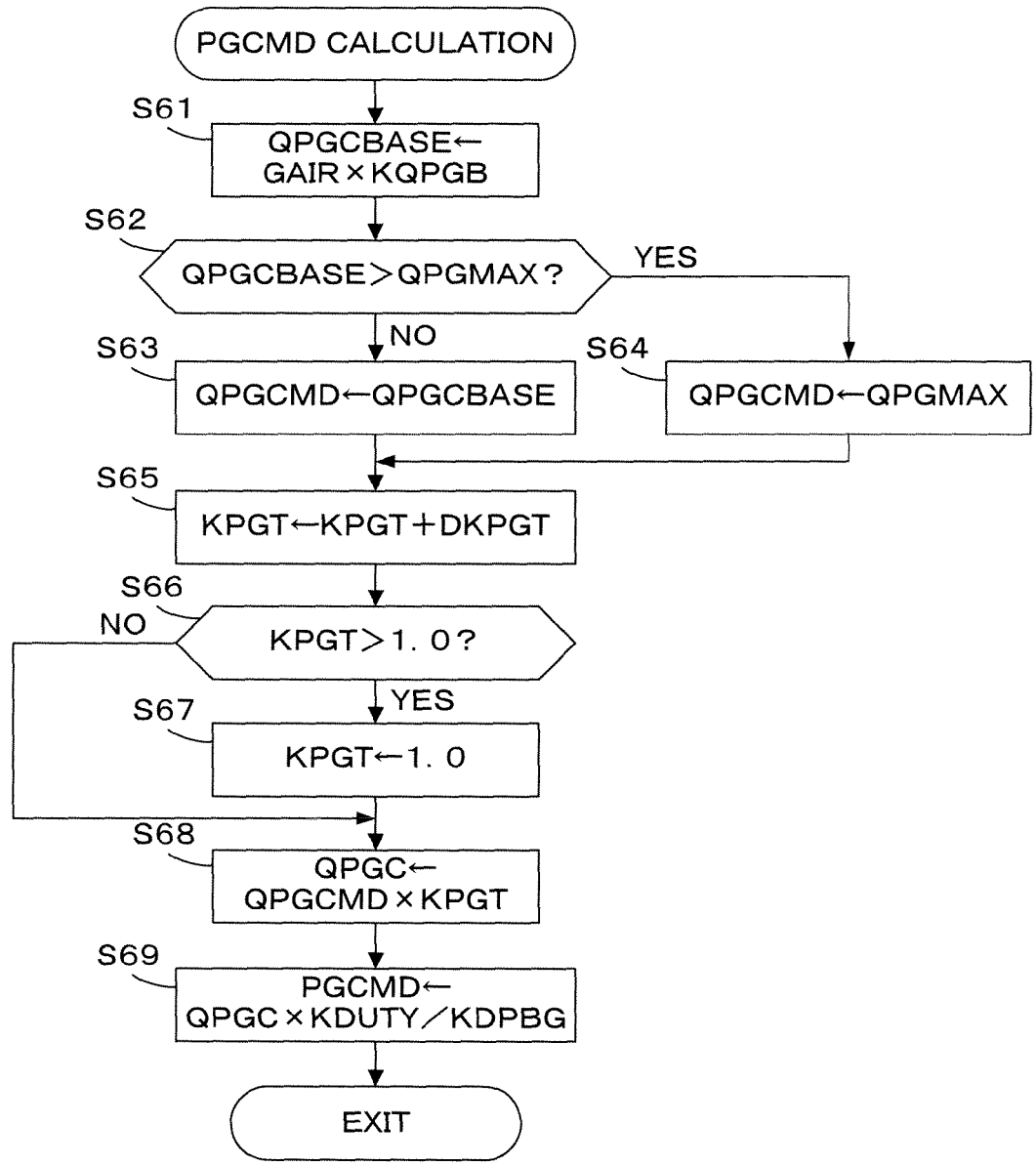
FIG. 12 is a flowchart of the PGCMD calculation process executed in the process of FIG. 11.

In step S14, the detected intake air flow rate GAIR [g/sec] and the purge gas flow rate QPGC which is calculated in step S68 of FIG. 12 are respectively applied to the following equations (18) and (19) to perform the conversion to the intake air amount GAIRCYL and the purge gas amount GPGC in one intake stroke of one cylinder. KC in the equations (18) and (19) is a conversion coefficient.

$$GAIRCYL = GAIR \times KC/NE \quad (18)$$

$$GPGC = QPGC \times KC/NE \quad (19)$$

In step S15, the intake air amount GAIRCYL and the purge gas amount GPGC are applied to the following equation (20) to calculate the intake gas amount GINGASCYL.

$$GINGASCYL = GAIRCYL + GPGC \quad (20)$$

In step S16, the total EGR ratio REGRT is calculated by the above-described equation (15).

Figure 11:
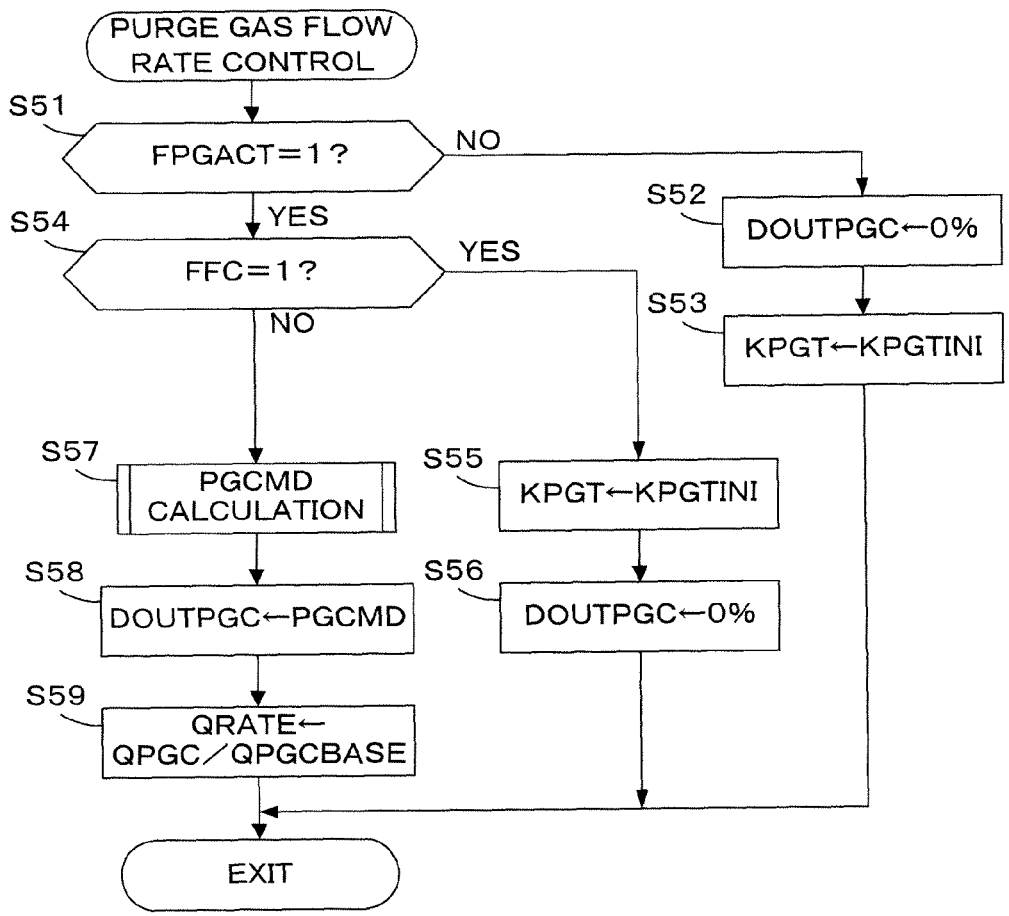
FIG. 11 is a flowchart of a process for calculating a flow rate of the evaporative fuel/air mixture.

FIG. 11 is a flowchart of a process for performing a purge gas flow rate control, i.e., an opening control of the purge control valve 26. This process is executed at predetermined time intervals (for example, 80 msec) by the CPU in the ECU 5.

In step S51, it is determined whether or not a purge execution flag FPGACT is "1". The purge execution flag FPGACT is set to "1" when the engine 1 is in the operating condition in which the purge gas is supplied to the intake passage 2. If the answer to step S51 is negative (NO), a purge control valve actuating duty DOUTPGC is set to "0" (step S52), and a transient control coefficient KPGT is set to a predetermined initial value KPGTINI (<1.0) (step S53). The transient control coefficient KPGT is a coefficient for limiting the purge gas flow rate at the beginning of supplying the purge gas. The transient control coefficient KPGT is set so as to increase with time lapse to "1.0" (refer to steps S65-S67 of FIG. 12).

If the answer to step S51 is affirmative (YES), i.e., the purge gas supply is performed, it is determined whether or not a fuel cut flag FFC is "1" (step S54). The fuel cut flag FFC is set to "1" in the operating condition in which the fuel supply to the engine 1 is temporarily stopped. If the fuel cut flag FFC is "1", the transient control coefficient KPGT is set to the predetermined initial value KPGTINI, and the purge control valve actuating duty DOUTPGC is set to "0" (steps S55 and S56).

If the answer to step S54 is negative (NO), the PGCMD calculation process shown in FIG. 12 is executed to calculate a target actuating duty PGCMD (step S57). In step S58, the purge control valve actuating duty DOUTPGC is set to the target actuating duty PGCMD. In step S59, the purge gas flow rate QPGC and the basic purge gas flow rate QPGCBASE which are calculated in the process of FIG. 12, are applied to the following equation (21) to calculate a purge gas flow rate ratio QRATE. The purge gas flow rate ratio QRATE is used in step S80 of FIG. 13.

$$QRATE = QPGC/QPGCBASE \quad (21)$$

FIG. 12 is a flowchart of the PGCMD calculation process executed in step S57 of FIG. 11.

In step S61, the detected intake air flow rate GAIR is applied to the following equation (22) to calculate a basic purge gas flow rate QPGCBASE. In the equation (22), KQPGB is a predetermined target purge ratio.

$$QPGCBASE = GAIR \times KQPGB \quad (22)$$

In step S62, it is determined whether or not the basic purge gas flow rate QPGCBASE is greater than an upper limit value QPGMAX. If the answer to step S62 is negative (NO), the target purge gas flow rate QPGCMD is set to the basic purge gas flow rate QPGCBASE (step S63). If the basic purge gas flow rate QPGCBASE is greater than the upper limit value QPGMAX, the target purge gas flow rate QPGCMD is set to the upper limit value QPGMAX (step S64).

In step S65, the transient control coefficient KPGT is increased by a predetermined amount DKPGT (<1.0). In step S66, it is determined whether or not the transient control coefficient KPGT is greater than "1.0". If the answer to step S66 is negative (NO), the process immediately proceeds to step S68. If the answer to step S66 is affirmative (YES), the transient control coefficient KPGT is set to "1.0" (step S67), and the process proceeds to step S68.

In step S68, the target purge gas flow rate QPGCMD and the transient control coefficient KPGT are applied to the following equation (23) to calculate the purge gas flow rate QPGC.

$$QPGC = QPGCMD \times KPGT \quad (23)$$

In step S69, the purge gas flow rate QPGC is applied to the following equation (24) to convert the purge gas flow rate QPGC to the target actuating duty PGCMD. KDUTY is a predetermined conversion factor, and KDPBG is a pressure difference coefficient which is set according to a pressure difference between the intake pressure PBA and the atmospheric pressure PA.

$$PGCMD = QPGC \times KDUTY/KDPBG \quad (24)$$

As apparent from the process of FIG. 12, the purge gas flow rate ratio QRATE calculated by step S59 of FIG. 11 takes a value less than "1.0" when the transient control coefficient KPGT is less than "1.0", or when the basic purge gas flow rate QPGCBASE is greater than the upper limit value QPGMAX. Otherwise, the purge gas flow rate ratio QRATE takes a value of "1.0".

Figure 13:
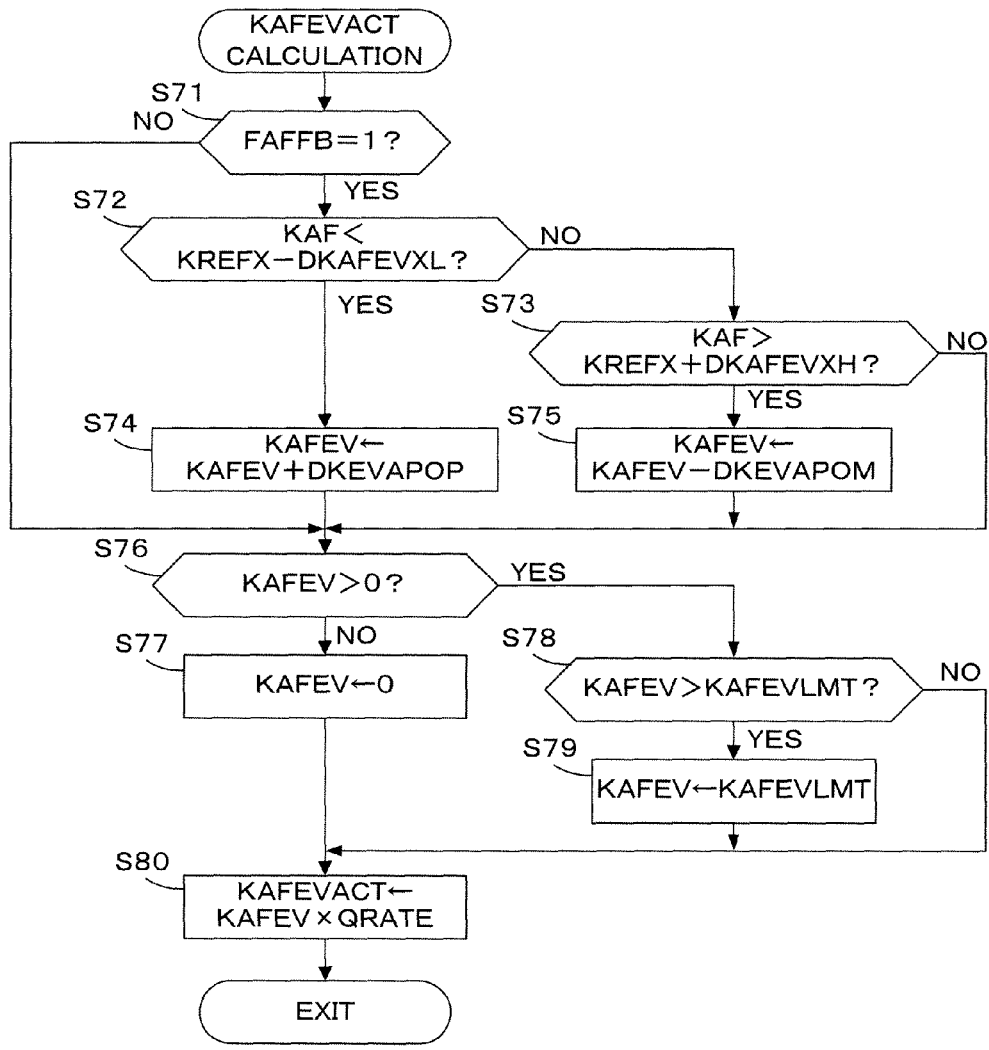
FIG. 13 is a flowchart of a process for calculating an evaporative fuel concentration coefficient (KAFEVACT).

FIG. 13 is a flowchart of a process for calculating an evaporative fuel concentration coefficient KAFEVACT indicative of the evaporative fuel concentration in the purge gas. This process is executed at predetermined time intervals (for example, 80 msec) by the CPU in the ECU 5.

In step S71, it is determined whether or not a feedback control flag FAFFB is "1". The feedback control flag FAFFB is set to "1" when performing the air-fuel ratio feedback control which makes the air-fuel ratio (KACT) detected by the LAF sensor 24 coincide with the target air-fuel ratio (KCMD). If the answer to step S71 is negative (NO), the process immediately proceeds to step S76.

If the answer to step S71 is affirmative (YES), i.e., the air-fuel ratio feedback control is performed, it is determined whether or not the air-fuel ratio correction coefficient KAF is less than a value obtained by subtracting a lower-side deviation DKAFEVXL from a learning value KREFX (step S72). The learning value KREFX is a moving average of the air-fuel ratio correction coefficient KAF calculated when the purge gas is not supplied to the intake passage 2. The lower-side deviation DKAFEVXL is a parameter for determining a deviation in the decreasing direction of the air-fuel ratio correction coefficient KAF which is caused by the purge gas supply to the intake passage 2. The lower-side deviation DKAFEVXL is set to a less value as the intake air flow rate GAIR increases.

The answer to step S72 is affirmative (YES), i.e., the deviation in the decreasing direction of the air-fuel ratio correction coefficient KAF due to the purge gas supply is comparatively large, the evaporative fuel concentration in the purge gas is determined to be comparatively high, to increase a basic concentration coefficient KAFEV by a predetermined addition amount DKEVAPOP with the following equation (25) (step S74).

$$KAFEV = KAFEV + DKEVAPOP \quad (25)$$

If the answer to step S72 is negative (NO), it is determined whether or not the air-fuel ratio correction coefficient KAF is greater than a value obtained by adding an upper-side deviation DKAFEVXH to the learning value KREFX (step S73). The upper-side deviation DKAFEVXH is a parameter for determining a deviation in the increasing direction of the air-fuel ratio correction coefficient KAF which is caused by the purge gas supply to the intake passage 2. The upper-side deviation DKAFEVXH is set to a less value as the intake air flow rate GAIR increases.

If the answer to step S73 is affirmative (YES), i.e., the deviation in the increasing direction of the air-fuel ratio correction coefficient KAF due to the purge gas supply is comparatively large, the evaporative fuel concentration in the purge gas is determined to be comparatively low, to reduce the basic concentration coefficient KAFEV by a predetermined subtraction amount DKEVAPOM with the following equation (26) (step S75).

$$KAFEV=KAFEV-DKEVAPOM \quad (26)$$

If the answer to step S73 is negative (NO), the process proceeds to step S76 without updating the basic concentration coefficient KAFEV.

In step S76, it is determined whether or not the basic concentration coefficient KAFEV is greater than "0". If the answer to step S76 is negative (NO), the basic concentration coefficient KAFEV is set to "0" (step S77). If the basic concentration coefficient KAFEV is greater than "0", it is further determined whether or not the basic concentration coefficient KAFEV is greater than the upper limit coefficient value KAFEVLMT (step S78). If the answer to step S78 is affirmative (YES), the basic concentration coefficient KAFEV is set to the upper limit coefficient value KAFEVLMT (step S79), and the process proceeds to step S80. If the answer to step S78 is negative (NO), the process immediately proceeds to step S80.

In step S80, the basic concentration coefficient KAFEV and the purge gas flow rate ratio QRATE are applied to the following equation (27), to calculate the evaporative fuel concentration coefficient KAFEVACT. The evaporative fuel concentration coefficient KAFEVACT is used in step S91 of FIG. 16.

$$KAFEVACT=KAFEV \times QRATE \quad (27)$$

Figure 14:
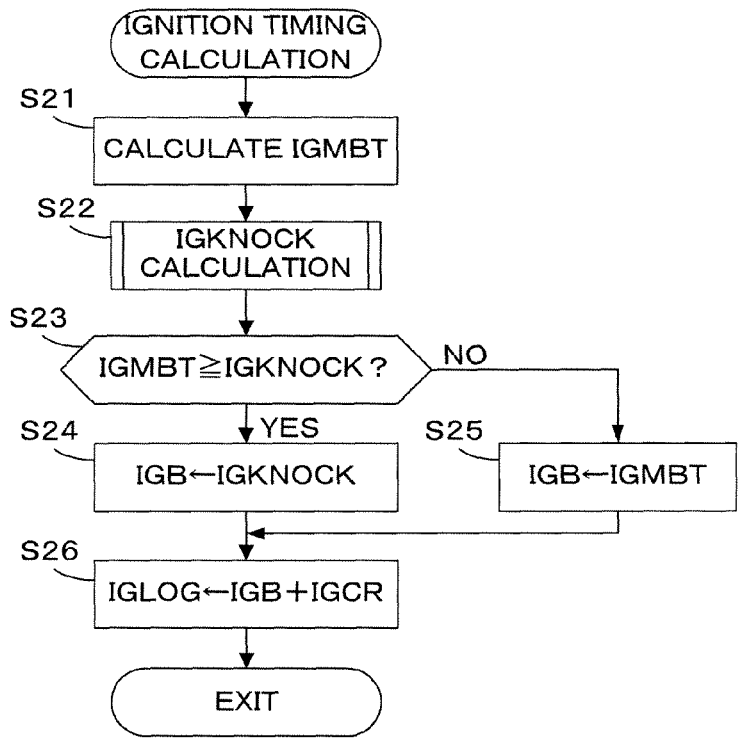
FIG. 14 is a flowchart of a process for calculating an ignition timing (IGLOG).

FIG. 14 is a flowchart of a process for calculating the ignition timing IGLOG indicated with an advancing angular amount from the compression top dead center. This process is executed by the CPU in the ECU 5 in synchronism with generation of the TDC pulse.

Figure 15:
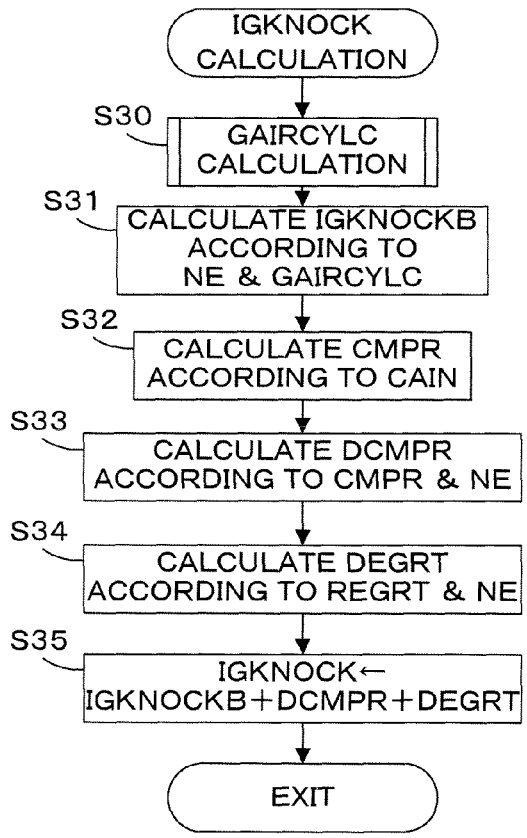
FIG. 15 is a flowchart of the IGKNOCK calculation process executed in the process of FIG. 14.

In step S21, an IGMBT map (refer to FIG. 7) is retrieved according to the engine rotational speed NE and the total EGR ratio REGRT to calculate the optimum ignition timing IGMBT. In step S22, the IGKNOCK calculation process shown in FIG. 15 is executed to calculate the knock limit ignition timing IGKNOCK.

In step S23, it is determined whether or not the optimum ignition timing IGMBT is equal to or greater than the knock limit ignition timing IGKNOCK. If the answer to step S23 is affirmative (YES), a basic ignition timing IGB is set to the knock limit ignition timing IGKNOCK (step S24). If the optimum ignition timing IGMBT is less than the knock limit ignition timing IGKNOCK in step S23, the basic ignition timing IGB is set to the optimum ignition timing IGMBT (step S25).

In step S26, the ignition timing IGLOG is calculated by adding the basic ignition timing IGB and a correction value IGCR which is for example calculated according to the engine coolant temperature TW.

The CPU in the ECU 5 performs the ignition with the spark plug 15 according to the calculated ignition timing IGLOG.

FIG. 15 is a flowchart of the IGKNOCK calculation process executed in step S22 of FIG. 14.

Figure 16:
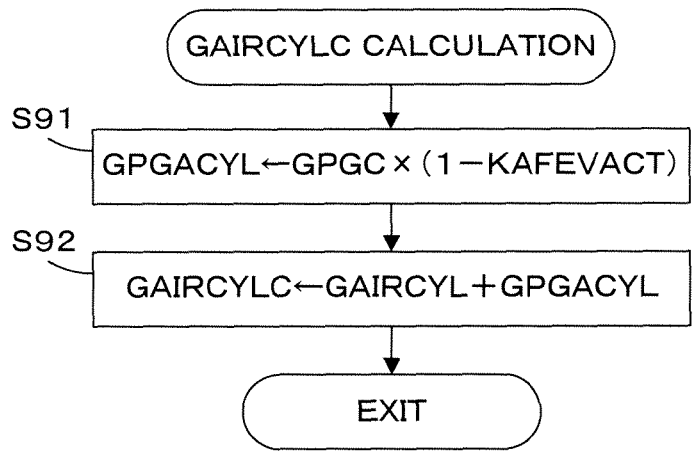
FIG. 16 is a flowchart of the GAIRCYLC calculation process executed in the process of FIG. 15.

In step S30, the GAIRCYLC calculation process shown in FIG. 16 is executed to calculate the corrected intake air amount GAIRCYLC. In step S91 of FIG. 16, the purge gas amount GPGC and the evaporative fuel concentration coefficient KAFEVACT are applied to the following equation (31) to calculate the secondary fresh air amount GPGACYL indicative of an amount of fresh air contained in the purge gas.

$$GPGACYL=GPGC \times (1-KAFEVACT) \quad (31)$$

In step S92, the corrected intake air amount GAIRCYLC is calculated by adding the secondary fresh air amount GPGACYL to the intake air amount GAIRCYL (with the following equation (32)).

$$GAIRCYLC=GAIRCYL+GPGACYL \quad (32)$$

Returning to FIG. 15, in step S31, an IGKNOCKB map is retrieved according to the engine rotational speed NE and the corrected intake air amount GAIRCYLC, to calculate a basic knock limit ignition timing IGKNOCKB. The IGKNOCKB map is set corresponding to the state where the total EGR ratio REGRT is set to a predetermined reference value and the intake valve operating phase CAIN is set to "0 degree".

Figure 17:
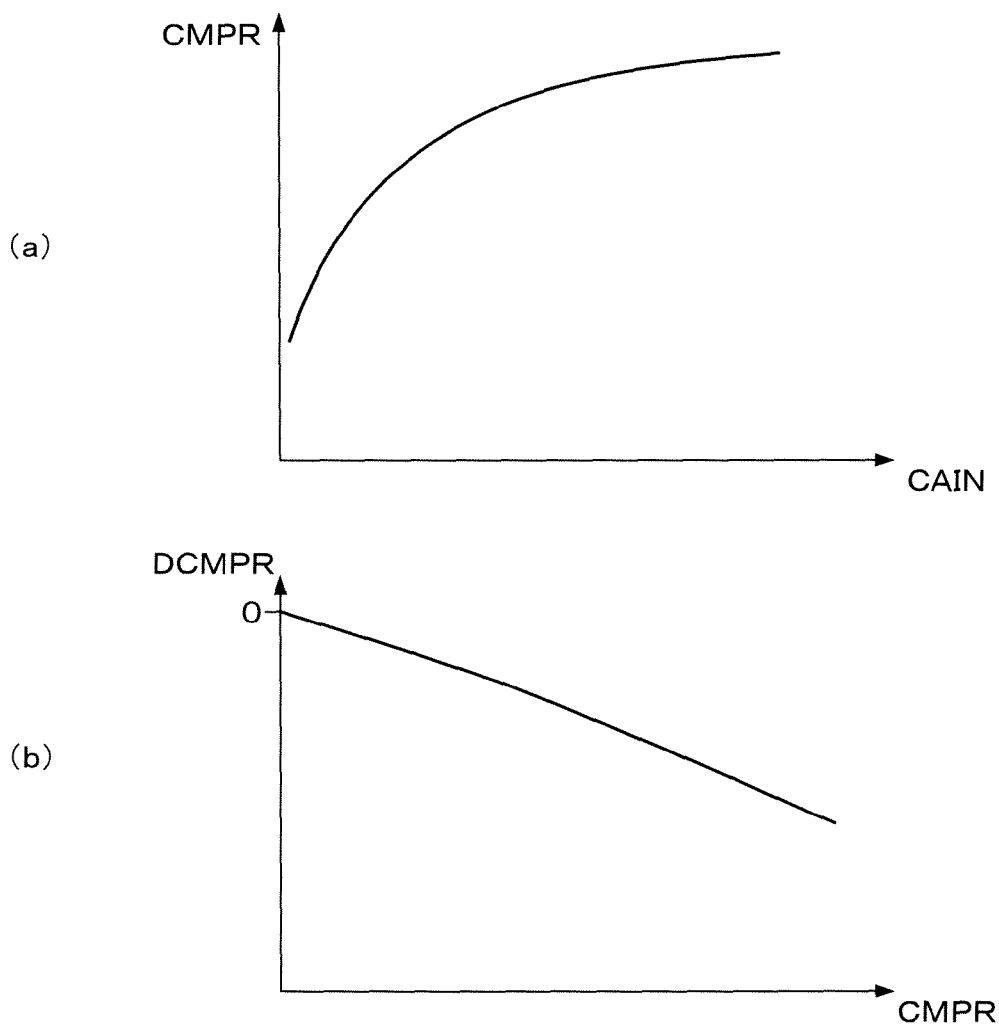
FIG. 17 shows graphs for illustrating the table and the map which are referred to in the process of FIG. 15.

In step S32, a CMPR table shown in FIG. 17(a) is retrieved according to the intake valve operating phase CAIN to calculate the effective compression ratio CMPR. The intake valve closing timing CACL changes depending on the intake valve operating phase CAIN, which accordingly changes the effective compression ratio CMPR. The relationship between the intake valve operating phase CAIN and the effective compression ratio CMPR is previously calculated and set as the CMPR table.

In step S33, a DCMPR map is retrieved according to the effective compression ratio CMPR and the engine rotational speed NE to calculate a compression ratio knock correction amount DCMPR. The compression ratio knock correction amount DCMPR takes a value which is equal to or less than "0", and is set so as to decrease as the effective compression ratio CMPR increases, as shown in FIG. 17(b).

In step S34, a DEGRT map is retrieved according to the total EGR ratio REGRT and the engine rotational speed NE to calculate the EGR knock correction amount DEGRT. The EGR knock correction amount DEGRT takes a value which is greater than "0", and is set so as to increase as the total EGR ratio REGRT increases, as shown in FIG. 9.

In step S35, the basic knock limit ignition timing IGKNOCKB, the compression ratio knock correction amount DCMPR, and the EGR knock correction amount DEGRT are applied to the following equation (33) to calculate the knock limit ignition timing IGKNOCK.

$$IGKNOCK=IGKNOCKB+DCMPR+DEGRT \quad (33)$$

It is to be noted that in this embodiment, the valve opening time period of the fuel injection valve 6, i.e., the fuel injection amount TOUT, is also calculated using the total EGR ratio REGRT.

Further, the knock limit ignition timing IGKNOCK is modified according to the detection result of knocking by the knock sensor 14. This modification process is omitted in FIG. 15.

Figure 18:
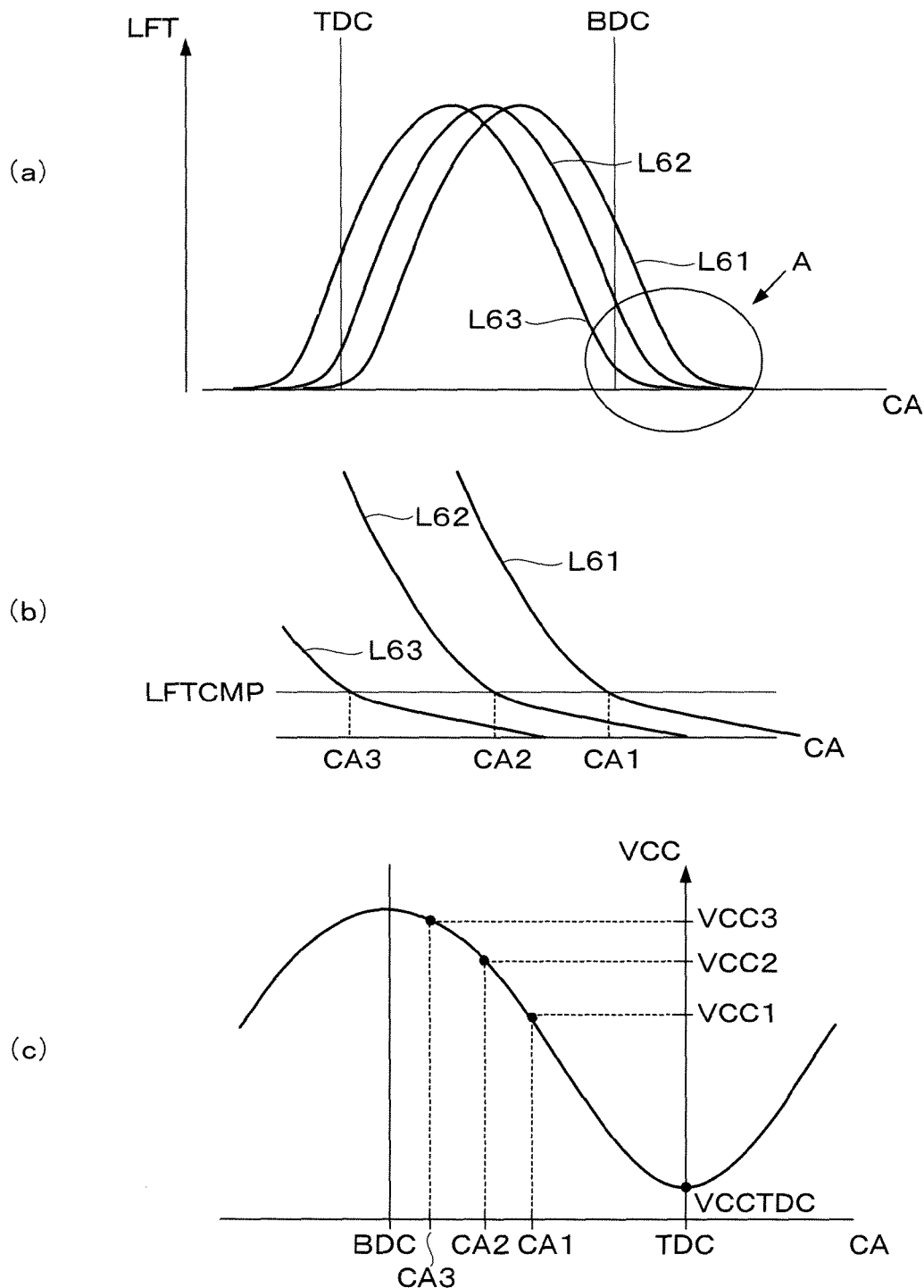
FIG. 18 shows graphs for illustrating a calculation method of the effective compression ratio (CMPR).

FIG. 18 shows graphs for explaining the method of calculating the effective compression ratio CMPR. FIG. 18(a) shows a lift curve of the intake valve, and FIG. 18(b) shows the A section in FIG. 18(a), i.e., an expanded view of the lift curve in the vicinity of the valve closing timing. Crank angles CA1, CA2, and CA3 at which the lift amount LFT is equal to a predetermined lift amount threshold value LFTCMP (which is set to a lift amount a little greater than "0") are calculated corresponding to the lift curves L61, L62, and L63 of FIGS. 18(a) and 18(b), and cylinder volumes VCC1, VCC2, and VCC3 which correspond respectively to the piston positions corresponding to the crank angles CA1, CA2, and CA3 as shown in FIG. 18(c), are calculated. The effective compression ratios CMPR1, CMPR2, and CMPR3 corresponding to the lift curves L61-L63 are calculated by the following equations (7)-(9). VCCTDC in these equations is a cylinder volume when the piston is positioned at the top dead center.

$$CMPR1=VCC1/VCCTDC \qquad (7)$$

$$CMPR2=VCC2/VCCTDC \qquad (8)$$

$$CMPR3=VCC3/VCCTDC \qquad (9)$$

Figure 19:
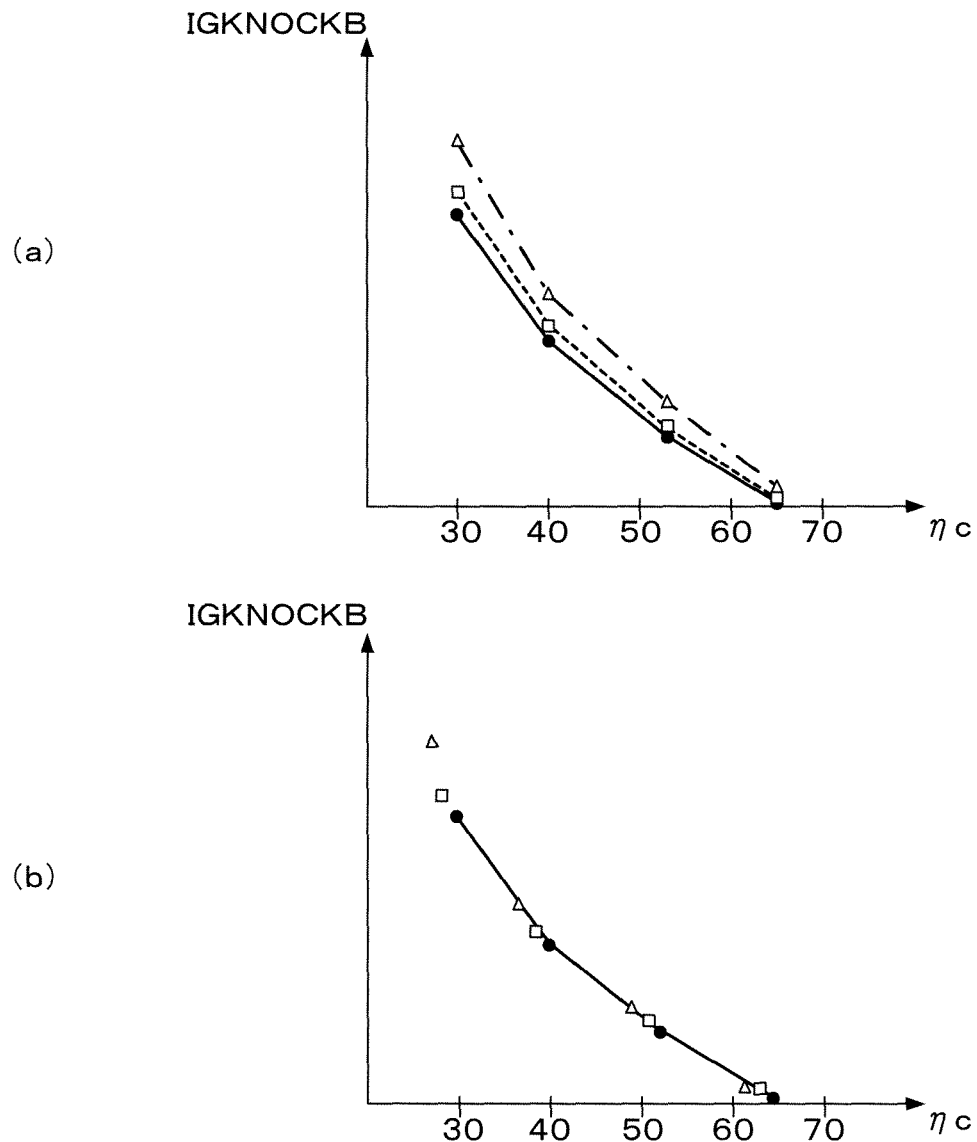
FIG. 19 shows graphs of a relationship between the charging efficiency (ηc) and the basic knock limit ignition timing (IGKNOCKB).

FIG. 19 shows relationships between the charging efficiency ηc and the basic knock limit ignition timing IGKNOCKB. Specifically, the solid line shown in FIG. 19(a) indicates an example in which the basic knock limit ignition timing IGKNOCKB is calculated according to the intake air amount GAIRCYL even when supplying the purge gas to the intake passage 2. On the other hand, the soling line shown in FIG. 19(b) indicates an example in which the basic knock limit ignition timing IGKNOCKB is calculated according to the corrected intake air amount GAIRCYLC.

The symbols □ and Δ shown in FIG. 19 indicate actual knock limit ignition timings, and correspond respectively to the state where the ratio of the purge gas in the intake gas amount is 25% and the state where the ratio of the purge gas in the intake gas amount is 75%. That is, if the basic knock limit ignition timing IGKNOCKB is calculated according to the intake air amount GAIRCYL, the basic knock limit ignition timing IGKNOCKB is set to a value on the retarded side with respect to the actual knock limit ignition timing, which makes the setting error of the basic knock limit ignition timing IGKNOCKB greater.

On the other hand, when the basic knock limit ignition timing IGKNOCKB is calculated according to the corrected intake air amount GAIRCYLC, the difference between the basic knock limit ignition timing IGKNOCKB and the actual knock limit ignition timing almost becomes "0", which can improve setting accuracy of the basic knock limit ignition timing IGKNOCKB.

As described above, in this embodiment, the theoretical wide-open air amount GAWOT, which is an intake air amount corresponding to the state where the throttle valve is fully opened, is calculated according to the intake valve operating phase CAIN and the engine rotational speed NE, and the theoretical intake air amount GATH, which is an intake air amount corresponding to the state where an amount of reciculated exhaust gases is equal to "0", is calculated according to the theoretical wide-open intake air amount GAWOT and the intake pressure PBA. Further, an amount GPGC of the evaporative fuel/air mixture supplied through the evaporative fuel passage 25 to the intake passage 2 is calculated, the intake gas amount GINGASCYL is calculated by correcting the intake air amount GAIRCYL using the evaporative fuel/air mixture amount GPGC, and the total EGR ratio REGRT is calculated using the theoretical intake air amount GATH and the intake gas amount GINGASCYL. Accordingly, it is not necessary for calculating the exhaust gas recirculation ratio to previously set many maps corresponding to various engine operating conditions, which can greatly reduce the man power for setting the maps. Further, even if the atmospheric pressure changes, the correcting calculation for the change in the atmospheric pressure is not necessary, which makes it possible to calculate the exhaust gas recirculation ratio simply and accurately. In addition, the total EGR ratio REGRT is calculated using the intake gas amount GINGACYL corrected using the evaporative fuel/air mixture amount GPGC supplied through the evaporative fuel passage 25 to the intake passage 2. Consequently, an accurate value of the total EGR ratio REGRT can be obtained even when the evaporative fuel is being supplied.

Further, the optimum ignition timing IGMBT is calculated according to the total EGR ratio REGRT, which makes it possible to obtain an accurate value of the optimum ignition timing IGMBT taking the internal exhaust gas recirculation into account. Further, it is confirmed that the relationship between the total EGR ratio REGRT and the optimum ignition timing IGMBT is not affected by the intake valve operating phase CAIN, or whether the external exhaust gas recirculation is performed or not (refer to FIG. 7). Accordingly, by setting the optimum ignition timing IGMBT according the total EGR ratio REGRT, the optimum ignition timing IGMBT suitable for the engine operating condition can easily be calculated. Consequently, by performing the ignition timing control using the calculated optimum ignition timing IGMBT, the output performance of the engine can sufficiently be realized.

Further, the evaporative fuel concentration coefficient KAFECACT indicative of the evaporative fuel concentration in the purge gas is calculated, and the secondary fresh air amount GPGACYL is calculated according to the evaporative fuel/air mixture amount GPGC and the evaporative fuel concentration coefficient KAFECACT. Further, the corrected intake air amount GAIRCYLC is calculated by correcting the intake air amount GAIRCYL with the secondary fresh air amount GPGACYL, and the basic knock limit ignition timing IGKNOCKB is calculated according to the engine rotational speed NE and the corrected intake air amount GAIRCYLC. Further, the EGR knock correction amount DEGRT is calculated according to the total EGR ratio REGRT, and the knock limit ignition timing IGKNOCK is calculated by correcting the basic knock limit ignition timing IGKNOCKB with the EGR knock correction amount DEGRT.

The knock limit ignition timing IGKNOCK is highly correlated with the total EGR ratio REGRT. Accordingly, performing the correction with the EGR knock correction amount DEGRT calculated according to the total EGR ratio REGRT, makes it possible to perform the ignition timing control with high accuracy. The engine output is therefore maximized within the range for surely avoiding the knocking. In addition, the amount of fresh air sucked into the cylinder is equal to a sum of the intake air amount GAIRCYL and the secondary fresh air amount GPGACYL. Accordingly, by calculating the knock limit ignition timing IGKNOCK according to the corrected intake air amount GAIRCYLC in addition to the total EGR ratio REGRT, calculation accuracy of the knock limit ignition timing IGKNOCK can be improved.

Further, the compression ratio knock correction amount DCMPR is calculated according to the intake valve operating phase CAIN, and the basic knock limit ignition timing IGKNOCKB is corrected according to the compression ratio knock correction amount DCMPR. Accordingly, an accurate value of the knock limit ignition timing IGKNOCK can be obtained when the intake valve operating phase CAIN is changed according to the engine operating condition.

Specifically, the effective compression ratio CMPR of the engine is calculated according to the intake valve operating phase CAIN, and the compression ratio knock correction amount DCMPR is calculated according to the effective compression ratio CMPR. The knock limit ignition timing IGKNOCK changes depending on the effective compression ratio CMPR. Accordingly, the correction can more appropriately be performed by calculating the effective compression ratio CMPR of the engine according to the intake valve operating phase CAIN, and correcting the basic knock limit ignition timing IGKNOCKB according to the effective compression ratio CMPR.

In this embodiment, the crank angle position sensor 11 and the intake pressure sensor 8 correspond respectively to the rotational speed detecting means and the intake pressure detecting means, the valve operating characteristic varying mechanism 42 corresponds to the intake valve operating phase varying mechanism, and the intake air flow rate sensor 13 corresponds to the intake air amount obtaining means. Further, the ECU 5 constitutes the wide-open intake air amount calculating means, the theoretical intake air amount calculating means, the evaporative fuel/air mixture amount calculating means, the intake gas amount calculating means, the exhaust gas recirculation ratio calculating means, the evaporative fuel concentration calculating means, the secondary fresh air amount calculating means, the corrected intake air amount calculating means, the optimum ignition timing calculating means, the knock limit ignition timing calculating means, and the correcting means. Specifically, steps S11 and S12 of FIG. 10 correspond to the wide-open intake air amount calculating means, step S13 corresponds to the theoretical intake air amount calculating means, step S15 corresponds to the intake gas amount calculating means, step S16 corresponds to the exhaust gas recirculation ratio calculating means, steps S61-S68 of FIG. 12 correspond to the evaporative fuel/air mixture amount calculating means, the process of FIG. 13 corresponds to the evaporative fuel concentration calculating means, step S21 of FIG. 14 corresponds to the optimum ignition timing calculating means, the process of FIG. 15 corresponds to the knock limit ignition timing calculating means, and steps S32, S33, and S35 correspond to the correcting means, step S91 of FIG. 16 corresponds to the secondary fresh air amount calculating means, and step S92 corresponds to the corrected intake air amount calculating means.

Second Embodiment

Figure 20:
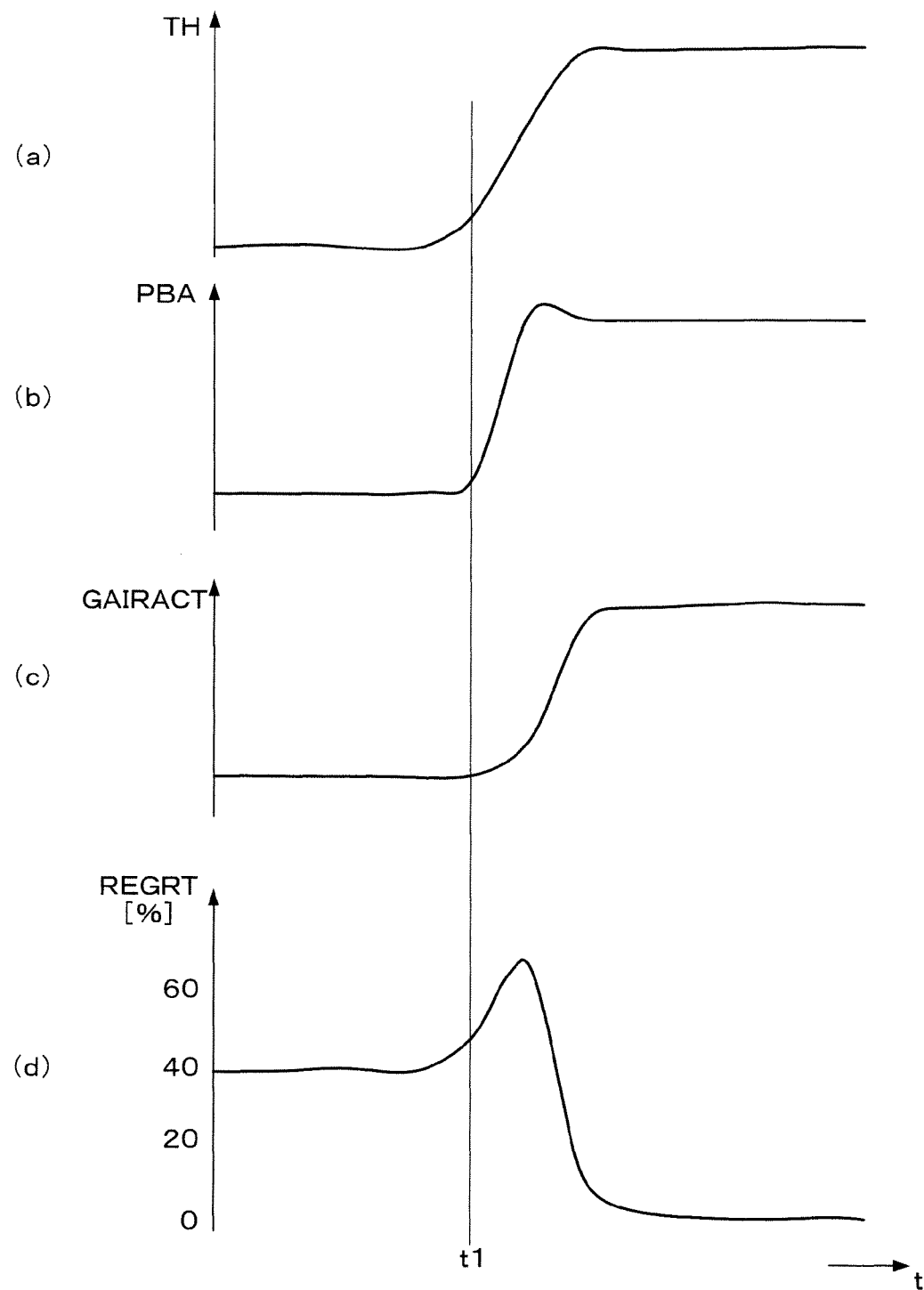
FIG. 20 shows time charts for illustrating the problem in the first embodiment.

The total EGR ratio REGRT calculated in the process shown in FIG. 10 accurately coincides with the actual total exhaust gas recirculation ratio, when the changing speed of the throttle valve opening TH is comparatively low. However, in the transient operating condition where the increasing speed of the throttle valve opening TH is high (hereinafter referred to as "rapid acceleration operating condition"), there is a problem that the calculation accuracy is reduced due to a delay of change in the amount GAIRACT of air actually sucked into the cylinder. FIG. 20 shows time charts for illustrating this problem. In FIG. 20, changes in the throttle valve opening TH, the intake pressure PBA, the actual intake air amount GAIRACT, and the calculated total EGR ratio REGRT, are shown when the engine operating condition changes from a low speed condition in which the engine rotational speed NE is comparatively low (e.g., 700 rpm) to the rapid acceleration operating condition.

As apparent by referring to FIGS. 20(a)-20(c), the increase in the intake pressure PBA delays from the increase in the throttle valve opening TH, and the increase in the actual intake air amount GAIRACT further delays from the increase in the intake pressure PBA. Accordingly, the total EGR ratio REGRT calculated using the intake pressure PBA and the detected intake air flow rate GAIR increases to about 60% (FIG. 20 (d)) although the actual total EGR ratio in the rapid acceleration operating condition decreases from the value before the acceleration starts. Consequently, the ignition timing IGLOG calculated using the total EGR ratio REGRT is greatly advanced from the desired value, which causes a knocking.

Figure 21:
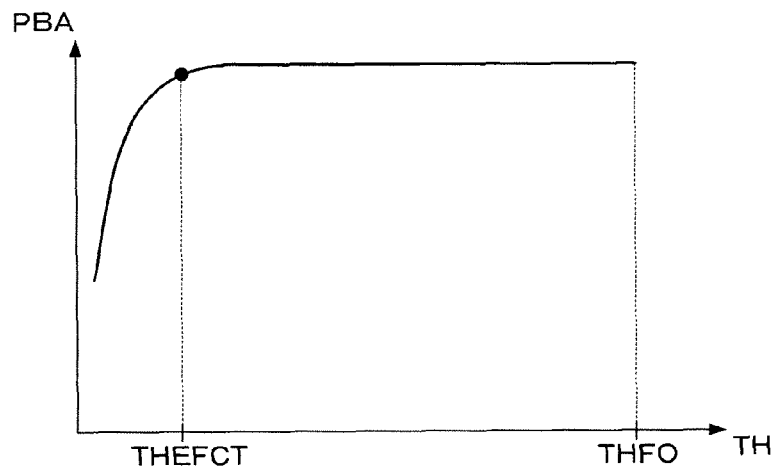
FIG. 21 shows a graph for illustrating the effective throttle valve opening (THEFCT).

In this embodiment, the total EGR ratio REGRT is therefore set to "0" when the throttle valve opening TH is equal to or greater than the effective throttle valve opening THEFCT. The effective throttle valve opening THEFCT is a throttle valve opening at which the intake pressure PBA hardly increases in response to the increase in the throttle valve opening TH, i.e., the throttle valve opening at which the increasing rate (dPBA/dTH) of the intake pressure PBA with respect to the increase in the throttle valve opening TH becomes equal to or less than a predetermined increasing rate under the condition where the engine rotational speed is fixed. For example, FIG. 21 shows the relationship between the throttle valve opening TH and the intake pressure PBA when the engine rotational speed is 700 rpm. THEFCT and THFO in FIG. 21 respectively correspond to the effective throttle valve opening and the fully-opened opening. Since the intake pressure PBA saturates at a comparatively low opening when the engine rotational speed is low, the effective throttle valve opening THEFCT takes a comparatively small value (for example, about 15%-20% of the fully-opened opening THFO).

By setting the total EGR ratio REGRT to "0" when the throttle valve opening TH is equal to or greater than the effective throttle valve opening THEFCT, the total EGR ratio REGRT is set to "0" in the vicinity of time t1 of FIG. 20. Accordingly, the above-described problem can be solved.

Figure 22:
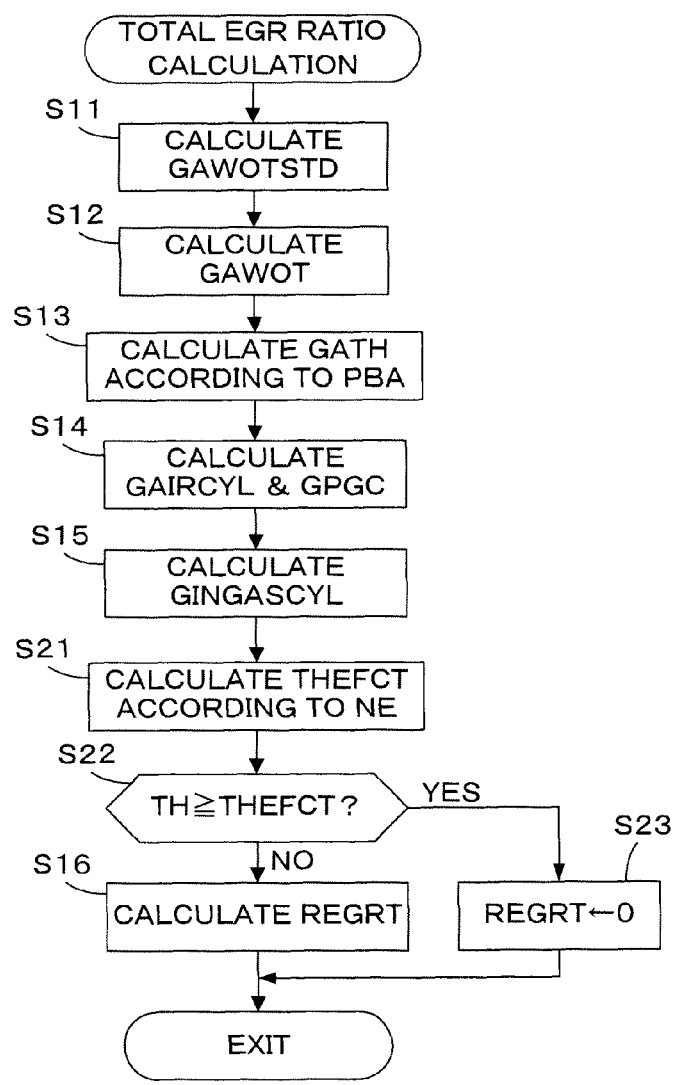
FIG. 22 is a flowchart of a process for calculating the total exhaust gas recirculation ratio (second embodiment).

FIG. 22 is a flowchart of the total EGR ratio calculation process in this embodiment. This process is obtained by adding steps S21-S23 to the process of FIG. 10.

Figure 23:
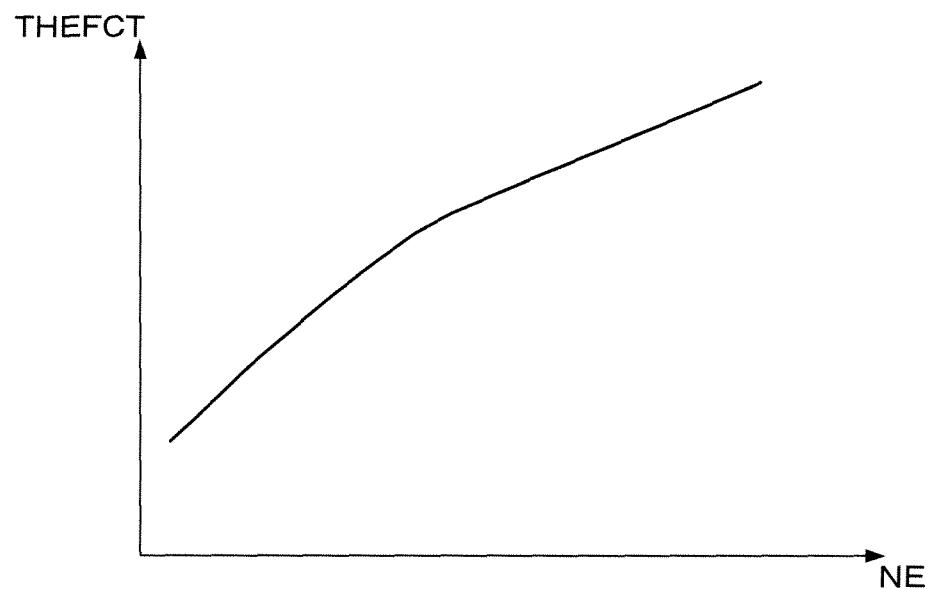
FIG. 23 shows a table referred to in the process of FIG. 22.

In step S21, a THEFCT table shown in FIG. 23 is retrieved according to the engine rotational speed NE to calculate the effective throttle valve opening THEFCT. The THEFCT table is set so that the effective throttle valve opening THEFCT increases as the engine rotational speed NE increases.

In step S22, it is determined whether or not the throttle valve opening TH is equal to or greater than the effective throttle valve opening THEFCT. If the answer to step S22 is affirmative (YES), the engine 1 is determined to be in the rapid acceleration operating condition, and the total EGR ratio REGRT is set to "0" (step S23). If the answer to step S22 is negative (NO), i.e., the throttle valve opening TH is less than the effective throttle valve opening THEFCT, the process proceeds to step S15 to calculate the total EGR ratio REGRT using the equation (15).

As described above, in this embodiment, the effective throttle valve opening THEFCT is calculated according to the engine rotational speed NE, and the total EGR ratio REGRT is set to "0" when the throttle valve opening TH is equal to or greater than the effective opening THEFCT. When performing the rapid acceleration in which the throttle valve opening TH rapidly increases from a low engine speed condition, the increase in the amount of air actually supplied to the cylinder delays from the increase in the intake pressure PBA (refer to FIG. 20). The calculation error therefore becomes large if calculating the total EGR ratio using the actual intake air amount GAIRCYL and the theoretical intake air amount GATH which is calculated according to the intake pressure PBA. When the throttle valve opening TH is equal to or greater than the effective throttle valve opening THEFCT, the actual exhaust gas recirculation ratio substantially becomes "0". Accordingly, the actual exhaust gas recirculation ratio can be approximated more accurately by setting the total EGR ratio REGRT to "0". Consequently, performing the ignition timing control and the fuel supply amount control using the total EGR ratio REGRT makes it possible to prevent unsuitable control during the transient operating condition of rapid acceleration, thereby preventing occurrence of knocking or deterioration of the exhaust gas characteristic.

In this embodiment, the throttle valve opening sensor 4 corresponds to the throttle valve opening detecting means, step S21 of FIG. 22 corresponds to the effective opening calculating means, and steps S15, S22, and S23 correspond to the exhaust gas recirculation ratio calculating means.

The present invention is not limited to the embodiments described above, and various modifications may be made. For example, the total EGR ratio REGRT is calculated using the intake air flow rate GAIR detected by the intake air flow rate sensor 13 in the above-described embodiments. Alternatively, an estimated intake air flow rate HGAIR may be calculated according to the throttle valve opening TH, the atmospheric pressure PA, and the intake pressure PBA, and the total EGR ratio REGRT may be calculated using the estimated intake air flow rate HGAIR.

Further, in the above-described embodiments, an example in which the present invention is applied to controlling the internal combustion engine wherein the external exhaust gas recirculation through the exhaust gas recirculation passage 22 is performed. The present invention is applicable also to controlling the internal combustion engine wherein no external exhaust gas recirculation is performed (only the internal exhaust gas recirculation is performed).

Further, in the above-described embodiments, the effective compression ratio CMPR is calculated according to the intake valve operating phase CAIN, and the compression ratio knock correction amount DCMPR is calculated according to the effective compression ratio CMPR. Alternatively, the compression ratio knock correction amount DCMPR may directly be calculated according to the intake valve operating phase CAIN.

Further, the present invention can also be applied to controlling a watercraft propulsion engine such as an outboard engine having a vertically extending crankshaft.

DESCRIPTION OF REFERENCE NUMERALS

1 Internal combustion engine
2 Intake passage
3 Throttle valve
4 Throttle valve opening sensor (throttle valve opening detecting means)
5 Electronic control unit (wide-open intake air amount calculating means, theoretical intake air amount calculating means, evaporative fuel/air mixture amount calculating means, intake gas amount calculating means, exhaust gas recirculation ratio calculating means, evaporative fuel concentration calculating means, secondary fresh air amount calculating means, corrected intake air amount calculating means, optimum ignition timing calculating means, knock limit ignition timing calculating means, correcting means, effective opening calculating means)
8 Intake pressure sensor (intake pressure detecting means)
11 Crank angle position sensor (rotational speed detecting means)
13 Intake air flow rate sensor (intake air amount obtaining means)
42 Valve operating characteristic varying mechanism (intake valve operating phase varying mechanism)

The invention claimed is:

1. A control system for an internal combustion engine having a throttle valve disposed in an intake passage of said engine, and an evaporative fuel passage for supplying an evaporative fuel/air mixture to said intake passage, the evaporative fuel/air mixture being a mixture of air and evaporative fuel generated in a fuel tank for supplying fuel to said engine, said control system being characterized by comprising:
rotational speed detecting means for detecting an rotational speed of said engine;
intake pressure detecting means for detecting an intake pressure of said engine;
wide-open intake air amount calculating means for calculating a wide-open intake air amount according to the engine rotational speed, the wide-open intake air amount being an intake air amount corresponding to a state where said throttle valve is fully opened;
theoretical intake air amount calculating means for calculating a theoretical intake air amount according to the wide-open intake air amount and the intake pressure, the theoretical intake air amount being an intake air amount corresponding to a state where no exhaust gas of said engine is recirculated to a combustion chamber of said engine;
intake air amount obtaining means for detecting or estimating an intake air amount of said engine;
evaporative fuel/air mixture amount calculating means for calculating an amount of the evaporative fuel/air mixture supplied through said evaporative fuel passage to said intake passage;
intake gas amount calculating means for calculating an intake gas amount by correcting the intake air amount using the evaporative fuel/air mixture amount; and
exhaust gas recirculation ratio calculating means for calculating an exhaust gas recirculation ratio using the theoretical intake air amount and the intake gas amount,
wherein said engine is controlled using the exhaust gas recirculation ratio.

2. A control system according to claim 1, further comprising ignition timing control means which includes optimum ignition timing calculating means for calculating an optimum ignition timing at which an output of said engine becomes maximum, according to the exhaust gas recirculation ratio, and controls an ignition timing of said engine using the optimum ignition timing.

3. A control system according to claim 2, further comprising:
evaporative fuel concentration calculating means for calculating an evaporative fuel concentration in the evaporative fuel/air mixture;
secondary fresh air amount calculating means for calculating a fresh air amount in the evaporative fuel/air mixture as a secondary fresh air amount according to the evaporative fuel/air mixture amount and the evaporative fuel concentration; and
corrected intake air amount calculating means for calculating a corrected intake air amount by correcting the intake air amount with the secondary fresh air amount,
wherein said ignition timing control means includes knock limit ignition timing calculating means for calculating a knock limit ignition timing according to the exhaust gas recirculation ratio and the corrected intake air amount, and performs the ignition timing control using any one of the optimum ignition timing and the knock limit ignition timing that is set to a more retarded value,
wherein the knock limit ignition timing corresponds to an occurrence limit of knocking in said engine.

4. A control system according to claim 3, wherein said engine is provided with an intake valve operating characteristic varying mechanism which changes an operating phase of the intake valve, and said ignition timing control means includes correcting means for correcting the knock limit ignition timing according to the operating phase of the intake valve.

5. A control system according to claim 4, wherein said correcting means calculates an effective compression ratio of said engine according to the operating phase of the intake valve, and corrects the knock limit ignition timing according to the effective compression ratio.

6. A control system according to any one of claims 1 to 5, further comprising:
   throttle valve opening detecting means for detecting an opening of said throttle valve; and
   effective opening calculating means for calculating an effective opening of said throttle valve according to the engine rotational speed, the effective opening being an throttle valve opening at which an increasing rate of the intake pressure with respect to an increase in the throttle valve opening becomes equal to or lower than a predetermined increasing rate,
   wherein said exhaust gas recirculation ratio calculating means sets the exhaust gas recirculation ratio to "0" when the throttle valve opening is equal to or greater than the effective opening.

7. A control method for an internal combustion engine having a throttle valve disposed in an intake passage of said engine, and an evaporative fuel passage for supplying an evaporative fuel/air mixture to said intake passage, the evaporative fuel/air mixture being a mixture of air and evaporative fuel generated in a fuel tank for supplying fuel to said engine, said control method being characterized by comprising the steps of:
   a) detecting an rotational speed of said engine;
   b) detecting an intake pressure of said engine;
   c) calculating a wide-open intake air amount according to the engine rotational speed, the wide-open intake air amount being an intake air amount corresponding to a state where said throttle valve is fully opened;
   d) calculating a theoretical intake air amount according to the wide-open intake air amount and the intake pressure, the theoretical intake air amount being an intake air amount corresponding to a state where no exhaust gas of said engine is recirculated to a combustion chamber of said engine;
   e) detecting or estimating an intake air amount of said engine;
   f) calculating an amount of the evaporative fuel/air mixture supplied through said evaporative fuel passage to said intake passage;
   g) calculating an intake gas amount by correcting the intake air amount using the evaporative fuel/air mixture amount;
   h) calculating an exhaust gas recirculation ratio using the theoretical intake air amount and the intake gas amount; and
   i) controlling said engine using the exhaust gas recirculation ratio.

8. A control method according to claim 7, wherein said step i) includes the steps of:
   j) calculating an optimum ignition timing at which an output of said engine becomes maximum, according to the exhaust gas recirculation ratio; and
   k) controlling an ignition timing of said engine using the optimum ignition timing.

9. A control method according to claim 8, further comprising the steps of:
   l) calculating an evaporative fuel concentration in the evaporative fuel/air mixture;
   m) calculating a fresh air amount in the evaporative fuel/air mixture as a secondary fresh air amount according to the evaporative fuel/air mixture amount and the evaporative fuel concentration; and
   n) calculating a corrected intake air amount by correcting the intake air amount with the secondary fresh air amount,
   wherein said step k) includes the step of calculating a knock limit ignition timing according to the exhaust gas recirculation ratio and the corrected intake air amount, and the ignition timing control is performed using any one of the optimum ignition timing and the knock limit ignition timing that is set to a more retarded value, wherein the knock limit ignition timing corresponds to an occurrence limit of knocking in said engine.

10. A control method according to claim 9, wherein said engine is provided with an intake valve operating characteristic varying mechanism which changes an operating phase of the intake valve, and said step k) further includes the step of p) correcting the knock limit ignition timing according to the operating phase of the intake valve.

11. A control method according to claim 10, wherein said step p) includes the steps of:
    q) calculating an effective compression ratio of said engine according to the operating phase of the intake valve; and
    r) correcting the knock limit ignition timing according to the effective compression ratio.

12. A control method according to any one of claims 7 to 11, further comprising the steps of:
    s) detecting an opening of said throttle valve; and
    t) calculating an effective opening of said throttle valve according to the engine rotational speed, the effective opening being an throttle valve opening at which an increasing rate of the intake pressure with respect to an increase in the throttle valve opening becomes equal to or lower than a predetermined increasing rate, wherein the exhaust gas recirculation ratio is set to "0" when the throttle valve opening is equal to or greater than the effective opening.

13. A computer program embodied on a computer-readable storage medium for causing a computer to implement a control method for an internal combustion engine having a throttle valve disposed in an intake passage of said engine, and an evaporative fuel passage for supplying an evaporative fuel/air mixture to said intake passage, the evaporative fuel/air mixture being a mixture of air and evaporative fuel generated in a fuel tank for supplying fuel to said engine, said control method being characterized by comprising the steps of:
    a) detecting an rotational speed of said engine;
    b) detecting an intake pressure of said engine;
    c) calculating a wide-open intake air amount according to the engine rotational speed, the wide-open intake air amount being an intake air amount corresponding to a state where said throttle valve is fully opened;
    d) calculating a theoretical intake air amount according to the wide-open intake air amount and the intake pressure, the theoretical intake air amount being an intake air amount corresponding to a state where no exhaust gas of said engine is recirculated to a combustion chamber of said engine;
    e) detecting or estimating an intake air amount of said engine;

f) calculating an amount of the evaporative fuel/air mixture supplied through said evaporative fuel passage to said intake passage;
g) calculating an intake gas amount by correcting the intake air amount using the evaporative fuel/air mixture amount;
h) calculating an exhaust gas recirculation ratio using the theoretical intake air amount and the intake gas amount; and
i) controlling said engine using the exhaust gas recirculation ratio.

14. A computer program according to claim 13, wherein said step i) includes the steps of:
j) calculating an optimum ignition timing at which an output of said engine becomes maximum, according to the exhaust gas recirculation ratio; and
k) controlling an ignition timing of said engine using the optimum ignition timing.

15. A computer program according to claim 14, further comprising the steps of:
l) calculating an evaporative fuel concentration in the evaporative fuel/air mixture;
m) calculating a fresh air amount in the evaporative fuel/air mixture as a secondary fresh air amount according to the evaporative fuel/air mixture amount and the evaporative fuel concentration; and
n) calculating a corrected intake air amount by correcting the intake air amount with the secondary fresh air amount,
wherein said step k) includes the step of calculating a knock limit ignition timing according to the exhaust gas recirculation ratio and the corrected intake air amount, and the ignition timing control is performed using any one of the optimum ignition timing and the knock limit ignition timing that is set to a more retarded value,
wherein the knock limit ignition timing corresponds to an occurrence limit of knocking in said engine.

16. A computer program according to claim 15, wherein said engine is provided with an intake valve operating characteristic varying mechanism which changes an operating phase of the intake valve, and said step k) further includes the step of p) correcting the knock limit ignition timing according to the operating phase of the intake valve.

17. A computer program according to claim 16, wherein said step p) includes the steps of:
q) calculating an effective compression ratio of said engine according to the operating phase of the intake valve; and
r) correcting the knock limit ignition timing according to the effective compression ratio.

18. A computer program according to any one of claims 13 to 17, wherein said control method further comprises the steps of:
s) detecting an opening of said throttle valve; and
t) calculating an effective opening of said throttle valve according to the engine rotational speed, the effective opening being an throttle valve opening at which an increasing rate of the intake pressure with respect to an increase in the throttle valve opening becomes equal to or lower than a predetermined increasing rate,
wherein the exhaust gas recirculation ratio is set to "0" when the throttle valve opening is equal to or greater than the effective opening.

* * * * *